United States Patent
Matsunaga et al.

(10) Patent No.: US 8,489,292 B2
(45) Date of Patent: Jul. 16, 2013

(54) VEHICLE CONTROL APPARATUS

(75) Inventors: Hitoshi Matsunaga, Anjo (JP); Kei Kitajima, Toyota (JP)

(73) Assignee: Toyota Jidosha Kabushika Kaisha, Toyota-shi (JP)

( * ) Notice: Subject to any disclaimer, the term of this patent is extended or adjusted under 35 U.S.C. 154(b) by 614 days.

(21) Appl. No.: 12/608,278

(22) Filed: Oct. 29, 2009

(65) Prior Publication Data

US 2010/0049411 A1   Feb. 25, 2010

(30) Foreign Application Priority Data

Nov. 7, 2008   (JP) ................................. 2008-286438

(51) Int. Cl.
*B60W 10/10*   (2012.01)

(52) U.S. Cl.
USPC ............................................ 701/52; 477/107

(58) Field of Classification Search
USPC .............. 701/51–54, 57–58, 62; 477/34, 107, 477/115, 176, 177; 474/11, 18, 23
See application file for complete search history.

(56) References Cited

U.S. PATENT DOCUMENTS

| | | | |
|---|---|---|---|
| 5,697,866 A | 12/1997 | Okahara | |
| 5,882,277 A * | 3/1999 | Iizuka | 477/125 |
| 6,125,316 A * | 9/2000 | Sasaki et al. | 701/62 |
| 6,219,608 B1 * | 4/2001 | Abo et al. | 701/51 |
| 6,740,004 B2 * | 5/2004 | Mori | 477/97 |
| 7,118,501 B2 * | 10/2006 | Yamamoto et al. | 474/18 |
| 7,192,371 B2 * | 3/2007 | Yamamoto et al. | 474/18 |
| 7,229,372 B2 * | 6/2007 | Shimanaka et al. | 474/28 |
| 7,556,586 B2 | 7/2009 | Nakagawa et al. | |
| 7,641,031 B2 | 1/2010 | Nakamura et al. | |
| 7,785,231 B2 | 8/2010 | Kobayashi et al. | |
| 7,899,600 B2 * | 3/2011 | Thor | 701/54 |
| 8,121,763 B2 * | 2/2012 | Hou | 701/51 |
| 2006/0272914 A1 * | 12/2006 | Nakamura et al. | 192/3.29 |
| 2008/0066567 A1 * | 3/2008 | Kobayashi et al. | 74/336 R |
| 2008/0221765 A1 | 9/2008 | Thor | |
| 2008/0312038 A1 * | 12/2008 | Nakagawa et al. | 477/175 |

FOREIGN PATENT DOCUMENTS

| | | |
|---|---|---|
| DE | 195 19 461 A1 | 12/1995 |
| DE | 196 36 629 A1 | 3/1997 |
| DE | 10 2005 008 712 A1 | 8/2006 |
| DE | 10 2006 000 263 A1 | 1/2007 |

(Continued)

OTHER PUBLICATIONS

Office Action issued Oct. 29, 2010, in German Patent Application No. 10 2009 046 442.5-14 with English translation.

*Primary Examiner* — Thomas Black
*Assistant Examiner* — Ce Li
(74) *Attorney, Agent, or Firm* — Oblon, Spivak, McClelland, Maier & Neustadt, L.L.P.

(57) ABSTRACT

A downshift allowable vehicle speed is variably set according to a torque converter slippage amount. Specifically, a downshift allowable vehicle speed is variably set by, using a reference downshift allowable vehicle speed when the torque converter slippage amount is 0 and a gear ratio of the automatic transmission after a downshift, calculating an allowable vehicle speed correction amount based on the present torque converter slippage amount and the gear ratio after the downshift, and setting a value obtained by subtracting the allowable vehicle speed correction amount from the reference downshift allowable vehicle speed as the downshift allowable vehicle speed. By such setting, it is possible to set a higher downshift allowable vehicle speed as the torque converter slippage amount becomes smaller, so it is possible to expand a downshift allowable region when the manual gearshift mode is selected.

9 Claims, 15 Drawing Sheets

FOREIGN PATENT DOCUMENTS

| | | |
|---|---|---|
| DE | 10 2007 034 203 A1 | 2/2008 |
| DE | 10 2007 000 735 A1 | 4/2008 |
| DE | 10 2008 011 887 A1 | 9/2008 |
| DE | 11 2005 001 726 T5 | 4/2010 |
| JP | 60-113224 | 7/1985 |
| JP | 1-220765 | 9/1989 |
| JP | 3-182658 | 8/1991 |
| JP | 8-11591 | 1/1996 |
| JP | 9-264414 | 10/1997 |
| JP | 9-264415 | 10/1997 |
| JP | 10-89466 | 4/1998 |
| JP | 2001-336627 | 12/2001 |
| JP | 2003-63279 | 3/2003 |
| JP | 2004-346867 | 12/2004 |
| JP | 2007-139059 | 6/2007 |
| JP | 2007-205431 | 8/2007 |
| JP | 2008-261440 | 10/2008 |

* cited by examiner

FIG.4
|   | C1 | C2 | C3 | C4 | B1 | B2 | B3 | B4 | F0 | F1 | F2 | F3 |
|---|----|----|----|----|----|----|----|----|----|----|----|----|
| P |    |    |    |    |    |    |    |    |    |    |    |    |
| R |    |    | ○  |    | ◎  |    |    | ○  |    | ○  |    |    |
| N |    |    |    |    |    |    |    |    |    |    |    |    |
| 1st | ○ |    |    | ◎ |    |    |    | ◎ | ○ |    |    | ○ |
| 2nd | ○ |    |    | ◎ |    | ◎ | ○ |    | ○ | ○ | ○ |    |
| 3rd | ○ |    | ○ | ◎ | ◎ |    | △ |    | ○ | ○ |    |    |
| 4th | ○ | ○ | △ | ◎ |    |    | △ |    | ○ |    |    |    |
| 5th | △ | ○ | ○ |    | ○ |    | △ |    |    |    |    |    |
| 6th | △ | ○ |    |    | △ | ○ | △ |    |    |    |    |    |
○ engagement
◎ engagement during engine braking
△ engagement unrelated to power transmission
FIG.5
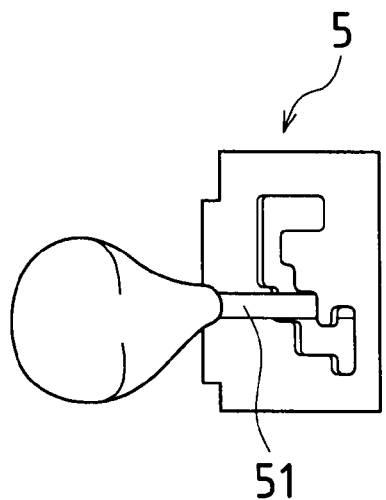
(a)
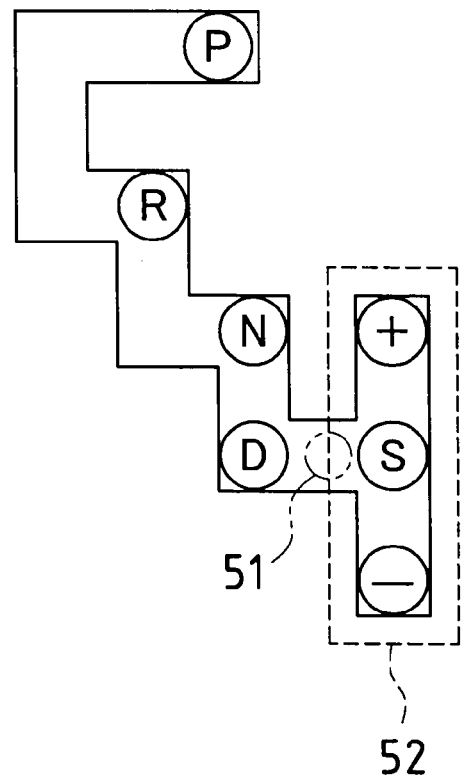
(b)

(a)

(b)

VEHICLE CONTROL APPARATUS

BACKGROUND OF THE INVENTION

This application claims priority under 35 U.S.C. §119(a) on Patent Application No. 2008-286438 filed in Japan on Nov. 7, 2008, the entire contents of which are herein incorporated by reference.

The present invention relates to a vehicle control apparatus equipped with an engine (internal combustion engine), a torque converter, and an automatic transmission.

In a vehicle equipped with an engine, as a transmission that appropriately transmits torque and revolution speed generated by the engine to drive wheels according to the running state of the vehicle, an automatic transmission is known that automatically optimally sets a gear ratio between the engine and the drive wheels.

Examples of an automatic transmission mounted in a vehicle include a planetary gear transmission that sets a gear using frictionally engaging elements such as a clutch and a brake and a planetary gear apparatus, and a belt-driven stepless transmission (CVT: Continuously Variable Transmission) that steplessly adjusts the gear ratio.

In a vehicle in which a planetary gear-type automatic transmission is mounted, a gearshift map that has gearshift lines (gear switching lines) for obtaining an optimal gear according to the vehicle speed and an accelerator opening degree (or throttle opening degree) is stored in an ECU (Electronic Control Unit) or the like, a target gear is calculated with reference to the gearshift map based on the vehicle speed and the accelerator opening degree, and based on that target gear, a gear (gear ratio) is automatically set by engaging or releasing a clutch, a brake, a one-way clutch, and the like, which are frictionally engaging elements, in a predetermined state.

In the configuration of a belt-driven stepless transmission, a belt is wrapped around a primary pulley (input side pulley) and a secondary pulley (output side pulley) that are provided with a pulley groove (V groove), and by reducing the groove width of one pulley while increasing the groove width of the other pulley, the contact radius (effective diameter) of the belt to each of the pulleys is continuously changed to steplessly set a gear ratio.

In a vehicle equipped with such an automatic transmission, a torque converter is disposed in a power transmission path from the engine to the automatic transmission. The torque converter, for example, is provided with a pump impeller connected to an engine output shaft (crank shaft), a turbine runner connected to an input shaft of the automatic transmission, and a stator provided between the pump impeller and the turbine runner via a one-way clutch. The torque converter is a hydraulic transmission apparatus in which the pump impeller rotates according to rotation of the engine output shaft, and the turbine runner is rotationally driven by operating oil discharged from the pump impeller, thus transmitting engine output torque to the input shaft of the automatic transmission.

Widely adopted is a torque converter provided with a lockup clutch that puts an input side (pump side) and an output side (turbine side) in a directly connected state, and by engaging (lockup on) or releasing (lockup off) the lockup clutch according to the operating state, the fuel consumption ratio (below, referred to as fuel consumption) is improved.

Also, in a vehicle equipped with this type of automatic transmission, a shift lever operated by a driver (user) is provided, and by operating the shift lever, it is possible to switch between, for example, a P position (parking range), an R position (reverse range), an N position (neutral range), a D position (drive range), and so forth. Also, recently, an automatic transmission whereby it is possible to select a manual gearshift mode has also come into use, and with such an automatic transmission, it is also possible to arbitrarily switch the gear ratio (gear) of the automatic transmission by operation of the shift lever by the driver (for example, see JP 2008-261440A and JP 2007-139059A).

In an automatic transmission in which a manual gearshift mode is selectable, a downshift allowable vehicle speed is set in order to prevent over-revving (over-revolutions) of the engine when downshifting in the manual gearshift mode, and downshifting of the automatic transmission is allowed in a circumstance in which the vehicle speed when there is a downshift request is less than the downshift allowable vehicle speed (for example, see JP 2001-336627A).

Also, in an automatic transmission in which a manual gearshift mode is selectable, when the manual gearshift mode is selected, engine over-revving is prevented by executing an automatic upshift that reduces the gear ratio of the automatic transmission in a circumstance in which the engine revolutions have reached a maximum allowable revolutions (for example, see JP 2007-139124A). Below, this control is also referred to as "automatic upshift control in manual gearshift mode".

Technology for preventing engine over-revving in an automatic transmission in which a manual gearshift mode is selectable is also described in JP H10-89466A. In the technology described in JP H10-89466A, in the manual gearshift mode, downshifting is prohibited if engine revolutions when there is a downshift request exceed over-revolutions (maximum revolutions), and downshifting is allowed in a circumstance in which engine revolutions are no more than over-revolutions.

Incidentally, in a vehicle in which a manual gearshift mode is selectable, the downshift allowable vehicle speed is uniformly set. Moreover, because the engine revolutions fluctuate due to changes in vehicle state or the like, the downshift allowable vehicle speed is set to a low speed, allowing for a margin (degree of safety), such that engine over-revving can be prevented in all circumstances, even including such fluctuation. Therefore, there may be instances in which a downshift allowable region (region where a manual gearshift is possible in the manual gearshift mode) becomes small, and vehicle operability is reduced. Also, in automatic upshift control in the manual gearshift mode as well, for same reasons, the maximum allowable revolutions relative to engine revolutions are set low, and in this case as well, the region where a manual gearshift is possible in the manual gearshift mode is restricted.

The present invention was made in view of such circumstances, and it is an object thereof to provide a vehicle control apparatus whereby while preventing engine over-revving, it is possible to expand the region where a manual gearshift is possible in a manual gearshift mode.

SUMMARY OF THE INVENTION

The present invention presumes a vehicle control apparatus equipped with an engine, an automatic transmission, and a torque converter disposed between the engine and the automatic transmission, the vehicle control apparatus capable of selecting either an automatic gearshift mode in which gearshifting of the automatic transmission is automatically performed according to the vehicle running state, or a manual gearshift mode in which gearshifting of the automatic transmission is performed by manual operation by a driver; and in the invention, such a vehicle control apparatus is provided with an engine revolutions detection means that detects revolutions of the engine, a turbine revolutions detection means that detects turbine revolutions of the torque converter, and a slippage amount calculation means that calculates a torque converter slippage amount that is the difference in revolutions between the engine revolutions and the turbine revolutions, wherein a maximum value of a region where manual gearshifting is possible in the manual gearshift mode is variably set based on the torque converter slippage amount.

In one specific configuration of the invention, a downshift allowable vehicle speed (maximum value of a region where manual gearshifting is possible) at which a downshift is allowed in the manual gearshift mode is variably set based on the torque converter slippage amount. In this case, the downshift allowable vehicle speed may be prescribed by revolutions of an output shaft of the automatic transmission corresponding to vehicle speed.

In another configuration of the invention, when performing an automatic upshift control in the manual gearshift mode, the maximum allowable revolutions (maximum value of a region where manual gearshifting is possible) at which the automatic upshift is executed are variably set based on the torque converter slippage amount.

Next, principles of the present invention for addressing problems will be described.

First, even when the vehicle speed and vehicle acceleration are the same, a margin relative to engine over-revving differs according to the torque converter slippage amount. Specifically, in a case where the torque converter slippage amount is small and in a case where the torque converter slippage amount is large, in a state in which the vehicle speed and the vehicle acceleration are the same, the turbine revolutions (output shaft revolutions of the automatic transmission) prior to a downshift are the same, so the engine revolutions after a downshift are larger in a case where the torque converter slippage amount is large, and therefore it is necessary to adopt a large margin relative to engine over-revving. On the other hand, when the torque converter slippage amount is small (or when the slippage amount is 0), it is possible to prevent over-revving even if a small amount of allowance for the margin is set.

Because the size of the margin relative to engine over-revving differs according to the size of the torque converter slippage amount as described above, it is possible to set a smaller margin relative to engine over-revving when the torque converter slippage amount is small than when the torque converter slippage amount is large. In other words, it is possible to set a higher downshift allowable vehicle speed when the manual gearshift mode is selected in a case where the torque converter slippage amount is small than in a case where the torque converter slippage amount is large.

With focus on such points, in the invention, a more appropriate downshift allowable vehicle speed in the manual gearshift mode is achieved by variably setting the downshift allowable vehicle speed according to the torque converter slippage amount. Thus, while preventing engine over-revving, it is possible to expand the downshift allowable region when the manual gearshift mode is selected (region where manual gearshifting is possible in the manual gearshift mode). As a result, it is possible to achieve an improvement in vehicle operability.

Also with respect to automatic upshift control in the manual gearshift mode, the same manner of thinking with respect to the margin relative to engine over-revving as in the above case of the downshift allowable vehicle speed is possible, so it is possible to set greater maximum allowable revolutions (maximum value of the region where manual gearshifting is possible) as the torque converter slippage amount is less. Accordingly, in this case as well, by variably setting the maximum allowable revolutions according to the torque converter slippage amount, while preventing engine over-revving, it is possible to expand the region where manual gearshifting is possible in the manual gearshift mode, and so it is possible to achieve an improvement in vehicle operability.

Next, specific configurations of the invention will be further described.

First, in an example configuration of the invention, a downshift allowable vehicle speed (or downshift allowable output shaft revolutions) when the torque converter slippage amount is 0 is set as a reference allowable vehicle speed (or reference allowable output shaft revolutions), and using the reference allowable vehicle speed and a gear ratio of the automatic transmission after the downshift, an allowable vehicle speed correction amount is calculated based on the present torque converter slippage amount calculated by the slippage amount calculation means and the gear ratio after the downshift, and a value obtained by subtracting the allowable vehicle speed correction amount from the reference allowable vehicle speed is set as the downshift allowable vehicle speed. According to this configuration, it is possible to set an appropriate downshift allowable vehicle speed that is commensurate with the actual torque converter slippage amount, so it is possible to more effectively expand the downshift allowable region when the manual gearshift mode is selected.

In another specific configuration, the downshift allowable vehicle speed (or downshift allowable output shaft revolutions) when the torque converter slippage amount is 0 is set as a reference allowable vehicle speed (or reference allowable output shaft revolutions), using the reference allowable vehicle speed and an allowable vehicle speed correction coefficient, an allowable vehicle speed correction amount is calculated by multiplying the allowable vehicle speed correction coefficient by the present torque converter slippage amount calculated by the slippage amount calculation means, and a value obtained by subtracting the allowable vehicle speed correction amount from the reference allowable vehicle speed is set as the downshift allowable vehicle speed.

In this configuration, the allowable vehicle speed correction coefficient (or allowable output shaft revolutions correction coefficient) may be a fixed value. Or, the allowable vehicle speed correction coefficient may be set smaller when vehicle acceleration is low than when vehicle acceleration is high. When the allowable vehicle speed correction coefficient is variably set according to the vehicle acceleration in this way, it is possible to more effectively expand the downshift allowable region when the manual gearshift mode is selected.

That is, when comparing a case where vehicle acceleration is high to a case where vehicle acceleration is low (i.e., when running at a constant speed), when vehicle acceleration is high, relative to the turbine revolutions when there was a downshift request, the turbine revolutions when the gearshift is completed increase to the extent that vehicle speed increased, so when determining whether a downshift is allowable in the operation state at the time of the downshift request, there is a possibility that engine over-revving will occur. In order to avoid this, it is necessary to set the downshift allowable vehicle speed with allowance for a large margin (degree of safety). On the other hand, when vehicle acceleration is low (i.e., when running at a constant speed), the turbine revolutions do not change much during a downshift gearshift, so the possibility that engine over-revving will occur is low, and to that extent the margin can be made smaller. Moreover, a smaller margin can be set as vehicle acceleration decreases. Therefore, it is possible to set a higher downshift allowable vehicle speed as vehicle acceleration decreases, so it is possible to expand the downshift allowable region when the manual gearshift mode is selected.

In another specific configuration, for the torque converter slippage amount calculated by the slippage amount calculation means, a plurality of threshold values whose sizes differ from each other are set in steps, and the downshift allowable vehicle speed for each of those threshold values is set lower for a larger threshold value. In the manual gearshift mode, the downshift allowable vehicle speed is calculated by comparing the torque converter slippage amount calculated by the slippage amount calculation means to the plurality of threshold values.

Another solving means of the present invention presumes a vehicle control apparatus that is equipped with an engine, an automatic transmission, a torque converter disposed between the engine and the automatic transmission, and a lockup clutch that establishes a state in which an input side and an output side of the torque converter are directly connected, the vehicle control apparatus capable of selecting either an automatic gearshift mode in which gearshifting of the automatic transmission is automatically performed according to the vehicle running state, or a manual gearshift mode in which gearshifting of the automatic transmission is performed by manual operation by a driver. This vehicle control apparatus is provided with an engine revolutions detection means that detects revolutions of the engine, a turbine revolutions detection means that detects turbine revolutions of the torque converter, a slippage amount calculation means that calculates a torque converter slippage amount that is the difference in revolutions between the engine revolutions and the turbine revolutions, and a lockup state determination means that determines a lockup state of the lockup clutch from the torque converter slippage amount, and in the vehicle control apparatus, a maximum value of a region where manual gearshifting is possible in the manual gearshift mode is variably set based on the lockup state.

In a specific configuration of this invention, a downshift allowable vehicle speed in the manual gearshift mode (maximum value of the region where manual gearshifting is possible) is variably set based on the lockup state of the lockup clutch. In this case, the downshift allowable vehicle speed may be prescribed by revolutions of an output shaft of the automatic transmission corresponding to vehicle speed.

Next, problem-solving principles of this invention will be described.

When the lockup clutch is in a lockup on state, the engine revolutions and the turbine revolutions are the same, but when in a lockup off state, a difference in revolutions (slippage amount) between the engine revolutions and the turbine revolutions may occur, so for the same reasons as in the case of the above torque converter slippage amount, in a lockup on state, it is possible to set a smaller margin relative to engine over-revving than in a lockup off state.

In consideration of such points, in this invention, a configuration is adopted in which the downshift allowable vehicle speed (maximum value of a region where manual gearshifting is possible) in the manual gearshift mode is variably set based on the lockup state (specifically, lockup on or lockup off). With such a configuration, it is possible to achieve a more appropriate downshift allowable vehicle speed in the manual gearshift mode, and thus, while preventing engine over-revving, it is possible to expand the downshift allowable region when the manual gearshift mode is selected. As a result, an improvement in vehicle operability can be achieved.

In this invention as well, when performing the automatic upshift control in the manual gearshift mode, by variably setting the maximum allowable revolutions (maximum value of a region where manual gearshifting is possible) based on the lockup state (lockup on or lockup off) of the lockup clutch, while preventing engine over-revving, it is possible to expand the region where manual gearshifting is possible in the manual gearshift mode, so an improvement in vehicle operability can be achieved.

BRIEF DESCRIPTION OF THE DRAWINGS

FIG. 4 is an operation table of the automatic transmission shown in FIG. 3.

FIG. 5 includes FIGS. 5A and 5B, where FIG. 5A is a perspective view of relevant parts of a shift operation apparatus, and FIG. 5B shows a shift gate of the shift operation apparatus.

FIG. 6 is a block diagram that shows the configuration of a control system of an ECU or the like.

FIGS. 11A and 11B are timing charts that show an example of changes in the engine revolutions Ne and a turbine revolutions Nt when downshifting.

FIGS. 19A and 19B are timing charts that show changes in the engine revolutions Ne and the turbine revolutions Nt when an accelerator on operation has been performed after an accelerator off/downshift operation.

Figure 1:
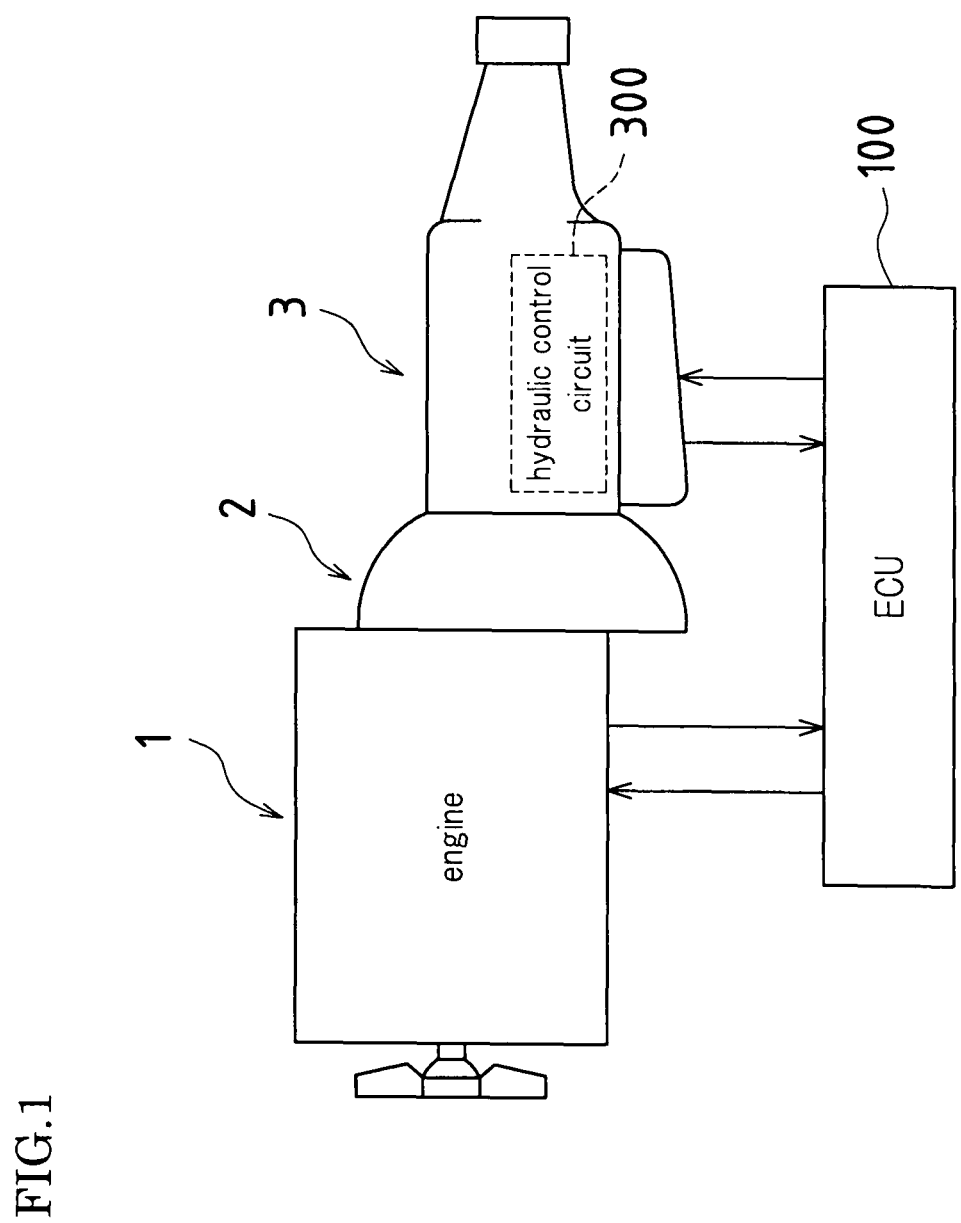
FIG. 1 is a schematic configuration view that shows part of a vehicle in which the present invention is applied.

DESCRIPTION OF REFERENCE NUMERALS 1 engine
2 torque converter
25 lockup clutch
3 automatic transmission
100 ECU
201 engine revolutions sensor
202 throttle opening degree sensor
203 turbine revolutions sensor
204 output shaft revolutions sensor
205 accelerator opening degree sensor
206 shift position sensor
210 acceleration sensor
300 hydraulic control circuit
301 lockup control valve

DESCRIPTION OF EMBODIMENTS

Hereinafter, embodiments of the present invention will be described with reference to the drawings.

FIG. 1 is a schematic configuration view that shows a vehicle in which the present invention is applied.

The vehicle in this example has an FR (front engine/rear drive) configuration, and is provided with an engine 1, an automatic transmission 3 having a torque converter 2, an ECU 100, and so forth, and a vehicle control apparatus of the present invention is realized by a program executed by the ECU 100. Each of the engine 1, the torque converter 2, the automatic transmission 3, and the ECU 100 is described below.

—Engine—

Figure 2:
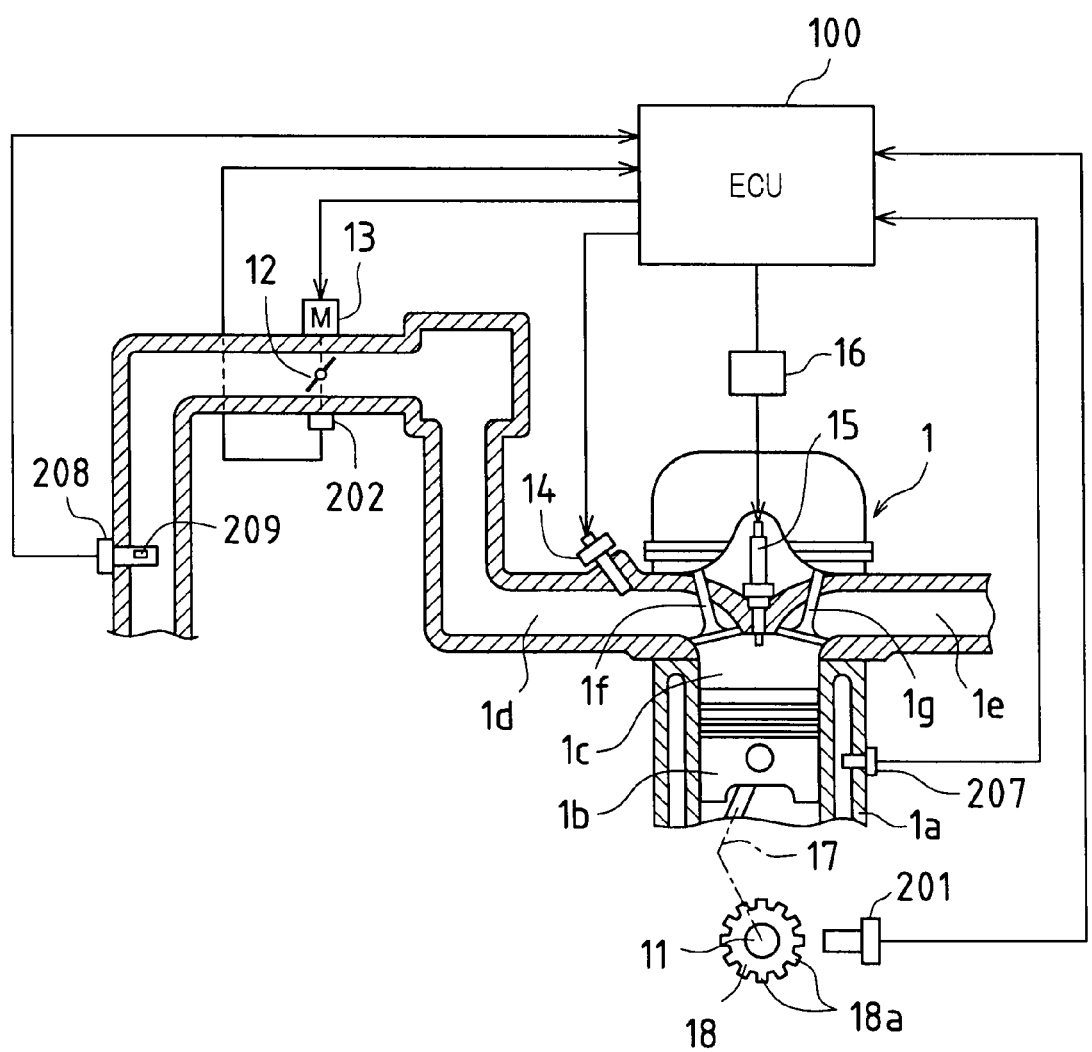
FIG. 2 is a schematic configuration view of an engine applied in the vehicle in FIG. 1.

The engine 1, for example, is a 4-cylinder gasoline engine, and as shown in FIG. 2, is provided with a piston 1b that moves back and forth in the vertical direction within a cylinder block 1a that constitutes each cylinder. The piston 1b is connected to a crank shaft 11 via a connecting rod 17, and back-and-forth movement of the piston 1b is converted to rotation of the crank shaft 11 by the connecting rod 17. The crank shaft 11 is connected to an input shaft of the torque converter 2.

Revolutions (engine revolutions Ne) of the crank shaft 11 are detected by an engine revolutions sensor 201. The engine revolutions sensor 201, for example, is an electromagnetic pickup, and generates a pulse-like signal (output pulse) that corresponds to protrusions 18a of a signal rotor 18 when the crank shaft 11 rotates.

A water temperature sensor 207 that detects an engine water temperature (coolant water temperature) is disposed in the cylinder block 1a of the engine 1. An ignition plug 15 is disposed in a combustion chamber 1c of the engine 1. Ignition timing of the ignition plug 15 is adjusted by an igniter 16. The igniter 16 is controlled by the ECU 100.

An intake path 1d and an exhaust path 1e are connected to the combustion chamber 1c of the engine 1. An intake valve 1f is provided between the intake path 1d and the combustion chamber 1c, and by driving the intake valve 1f open/closed, the intake path 1d and the combustion chamber 1c are put in communication with or blocked from each other. Also, an exhaust valve 1g is provided between the combustion chamber 1c and the exhaust path 1e, and by driving the exhaust valve 1g open/closed, the combustion chamber 1c and the exhaust path 1e are put in communication with or blocked from each other. Driving to open/close the intake valve 1f and the exhaust valve 1g is performed by respective rotation of an intake cam shaft and an exhaust cam shaft, to which rotation of the crank shaft 11 is transmitted.

A hot wire airflow meter (intake air amount sensor) 208, an intake temperature sensor 209 (built into the airflow meter 208), and an electronically controlled throttle valve 12 that adjusts the intake air amount of the engine 1 are disposed in the intake path 1d. The throttle valve 12 is driven by a throttle motor 13. The throttle valve 12 is capable of electronically controlling a throttle opening degree independent of accelerator pedal operation by the driver, and that opening degree (throttle opening degree) is detected by a throttle opening degree sensor 202. Also, the throttle motor 13 is driven/controlled by the ECU 100.

Specifically, the throttle opening degree of the throttle valve 12 is controlled such that it is possible to obtain an optimal intake air amount (target intake amount) according to the operating state of the engine 1, such as the engine revolutions Ne detected by the engine revolutions sensor 201 and the amount the accelerator pedal is depressed (accelerator opening degree) by the driver. More specifically, the actual throttle opening degree of the throttle valve 12 is detected using the throttle opening degree sensor 202, and feedback control of the throttle motor 13 of the throttle valve 12 is performed such that the actual throttle opening degree matches the throttle opening degree at which the above target intake amount can be obtained (target throttle opening degree).

An injector (fuel injection valve) 14 for fuel injection is disposed in the intake path 1d. Fuel at a predetermined pressure is supplied from a fuel tank to the injector 14 by a fuel pump, and fuel is injected into the intake path 1d. This injected fuel is mixed with intake air to become a mixture and is introduced to the combustion chamber 1c of the engine 1. The mixture (fuel+air) that has been introduced into the combustion chamber 1c is ignited by the ignition plug 15 and burns/explodes. Due to burning/explosion of this mixture within the combustion chamber 1c, the piston 1b moves back and forth and thus the crank shaft 11 rotates. The above operating state of the engine 1 is controlled by the ECU 100.

—Torque Converter—

Figure 3:
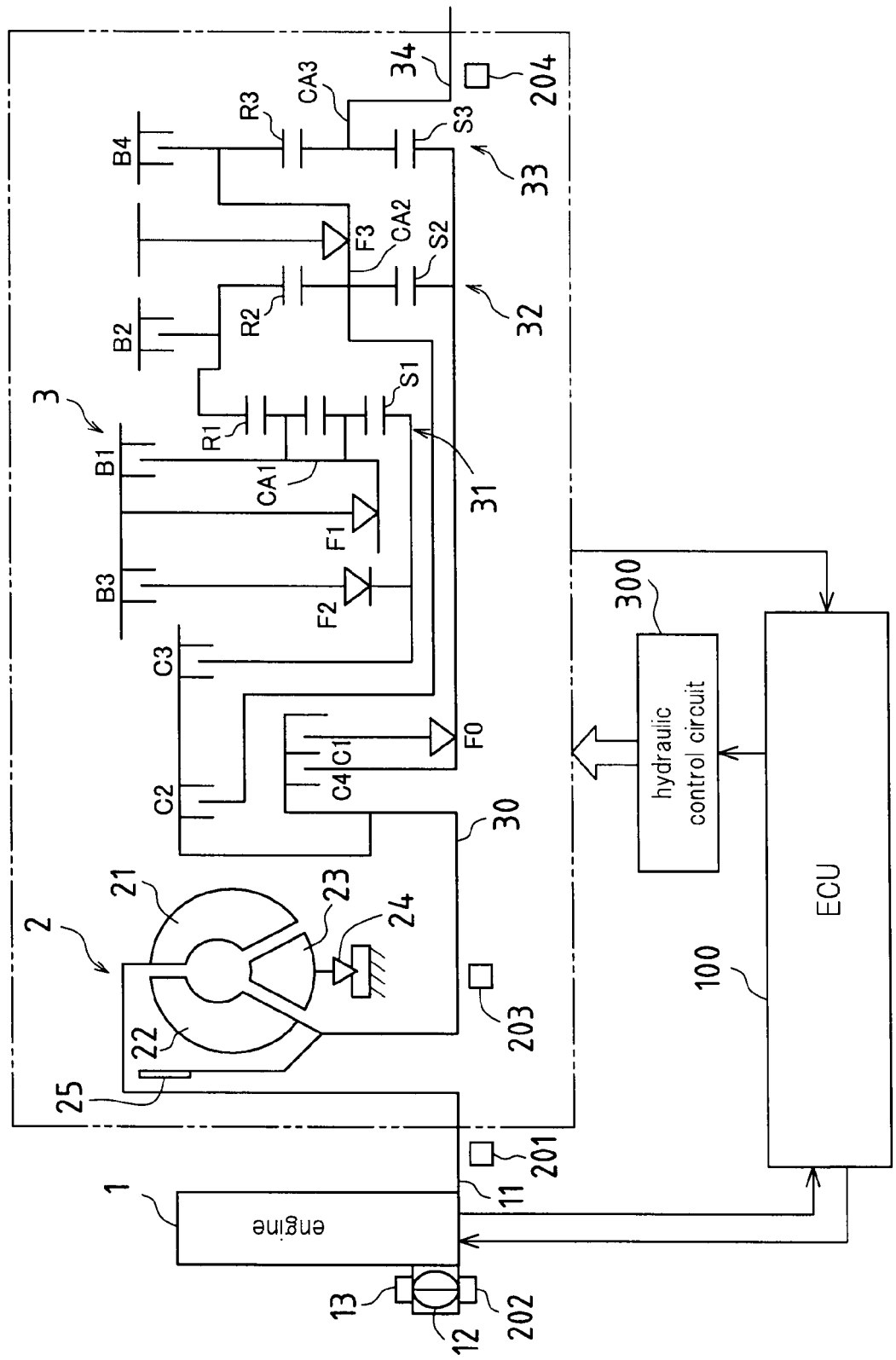
FIG. 3 shows both a schematic configuration view and control system block diagram of the engine and a torque converter and an automatic transmission that are applied in the vehicle in FIG. 1.

As shown in FIG. 3, the torque converter 2 is provided with an input shaft-side pump impeller 21, an output shaft-side turbine runner 22, a stator 23 that exhibits a torque amplification function, and a one-way clutch 24, and transmits power via a fluid between the pump impeller 21 and the turbine runner 22.

A lockup clutch 25 that establishes a state in which the input side and the output side are directly connected is provided in the torque converter 2, and by completely engaging the lockup clutch 25, the pump impeller 21 and the turbine runner 22 rotate together as a single body. Also, by engaging the lockup clutch 25 in a predetermined slippage state, during driving the turbine runner 22 rotates following the pump impeller 21 with a predetermined amount of slippage. The torque converter 2 and the automatic transmission 3 are connected by a rotating shaft. Turbine revolutions Nt of the torque converter 2 are detected by a turbine revolutions sensor 203. Engagement or release of the lockup clutch 25 of the torque converter 2 is controlled by the hydraulic control circuit 300 and the ECU 100.

—Automatic Transmission—

As shown in FIG. 3, the automatic transmission 3 is a planetary gear transmission provided with a double pinion-type first planetary gear apparatus 31, a single pinion-type second planetary gear apparatus 32, and a single-pinion-type third planetary gear apparatus 33. Power output from an output shaft 34 of the automatic transmission 3 is transmitted to drive wheels via a propeller shaft, a differential gear, a drive shaft, and so forth.

A sun gear S1 of the first planetary gear apparatus 31 of the automatic transmission 3 is selectively connected to an input shaft 30 via a clutch C3. Also, the sun gear S1 is selectively connected to a housing via a one-way clutch F2 and a brake B3, and thus rotation in the reverse direction (opposite direction as rotation of the input shaft 30) is blocked. A carrier CA1 of the first planetary gear apparatus 31 is selectively connected to the housing via a brake B1, and rotation in the reverse direction is always blocked by a one-way clutch F1 provided parallel to the brake B1. A ring gear R1 of the first planetary gear apparatus 31 is connected as a single body to a ring gear R2 of the second planetary gear apparatus 32, and is selectively connected to the housing via a brake B2.

A sun gear S2 of the second planetary gear apparatus 32 is connected as a single body to a sun gear S3 of the third planetary gear apparatus 33, and is selectively connected to the input shaft 30 via a clutch C4. Also, the sun gear S2 is selectively connected to the input shaft 30 via a one-way clutch F0 and a clutch C1, and thus rotation in the reverse direction as rotation of the input shaft 30 is blocked.

A carrier CA2 of the second planetary gear apparatus 32 is connected as a single body to a ring gear R3 of the third planetary gear apparatus 33, and selectively connected to the input shaft 30 via a clutch C2, and also is selectively connected to the housing via a brake B4. Also, rotation of the carrier CA2 in the reverse direction is always blocked by a one-way clutch F3 provided parallel to the brake B4. A carrier CA3 of the third planetary gear apparatus 33 is connected as a single body to the output shaft 34. Rotations of the output shaft 34 are detected by an output shaft revolutions sensor 204.

The engagement/release states of the clutches C1 to C4, brakes B1 to B4, and one-way clutches F0 to F3 of the above automatic transmission 3 are shown in the operation table in FIG. 4. In the operation table in FIG. 4, 'O' indicates engagement and a blank space indicates release. Also, '⊙' indicates engagement during engine braking, and 'Δ' indicates engagement unrelated to power transmission.

As shown in FIG. 4, in the automatic transmission 3 in this example, in a first (1st) forward gear, the clutch C1 is engaged, and the one-way clutches F0 and F3 operate. In a second forward gear (2nd), the clutch C1 and the third brake B3 are engaged, and the one-way clutches F0, F1, and F2 operate.

In a third forward gear (3rd), the clutches C1 and C3 are engaged, the brake B3 is engaged, and the one-way clutches F0 and F1 operate. In a fourth forward gear (4th), the clutches C1, C2, and C3 are engaged, the brake B3 is engaged, and the one-way clutch F0 operates.

In a fifth forward gear (5th), the clutches C1, C2, and C3 are engaged, and the brakes B1 and B3 are engaged. In a sixth forward gear (6th), the clutches C1 and C2 are engaged, and the brakes B1, B2, and B3 are engaged. In a reverse gear (R), the clutch C3 is engaged, the brake B4 is engaged, and the one-way clutch F1 operates.

In this way, in the automatic transmission 3 in this example, a gear (gear ratio) is set by engaging or releasing the clutches C1 to C4, the brakes B1 to B4, the one-way clutches F0 to F3, and the like, which are frictionally engaging elements, in a predetermined state. Engagement/release of the clutches C1 to C4 and the brakes B1 to B4 is controlled by the hydraulic control circuit 300 and the ECU 100.

—Shift Operation Apparatus—

On the other hand, a shift apparatus 5 as shown in FIG. 5 is disposed near a driver seat of the vehicle. A shift lever 51 is provided in the shift apparatus 5 so as to be displaceable.

In the shift operation apparatus 5 in this example, a P (parking) position, an R (reverse) position, an N (neutral) position, and a D (drive) position are set, and the driver can displace the shift lever 51 to a desired position. A shift position sensor 206 (see FIG. 6) performs detection at the respective positions of the P position, the R position, the N position, and the D position (including both an upshift (+) position and a downshift (−) position of an S position described below). An output signal of the shift position sensor 206 is input to the ECU 100. The ECU 100 is capable of distinguishing whether an automatic gearshift mode or a manual gearshift mode is selected based on the output signal of the shift position sensor 206.

The P position and the N position are non-travel positions selected when not causing the vehicle to travel, and the R position and the D position are travel positions selected when causing the vehicle to travel.

When the P position is selected with the shift lever 51, as shown in FIG. 4, the clutches C1 to C4, the brakes B1 to B4, and the one-way clutches F0 to F3 of the automatic transmission 3 are all released, and the output shaft 34 is locked by a parking mechanism (not shown). When the N position is selected, the clutches C1 to C4, the brakes B1 to B4, and the one-way clutches F0 to F3 of the automatic transmission 3 are all released.

When the D position is selected, the automatic gearshift mode, in which the automatic transmission 3 is automatically gearshifted according to the vehicle operating state or the like, is set, and gearshift control of the plurality of forward gears (six forward gears) of the automatic transmission 3 is performed automatically. When the R position is selected, the automatic transmission 3 is switched to the reverse gear.

Also, as shown in FIG. 5B, an S (sequential) position 52 is provided in the shift operation apparatus 5, and when the shift lever 51 has been operated to the S position 52, the manual gearshift mode (sequential mode), in which gearshift operations are performed by hand, is set. When the shift lever 51 is operated to upshift (+) or downshift (−) in the manual gearshift mode, the forward gear of the automatic transmission 3 is increased or decreased. Specifically, each time that the shift lever 51 is operated to upshift (+), the gear is increased by one (e.g., 1st→2nd→ . . . →6th). On the other hand, each time that the shift lever 51 is operated to downshift (−), the gear is decreased by one (e.g., 6th→5th→ . . . →1st).

—ECU—

Figure 6:
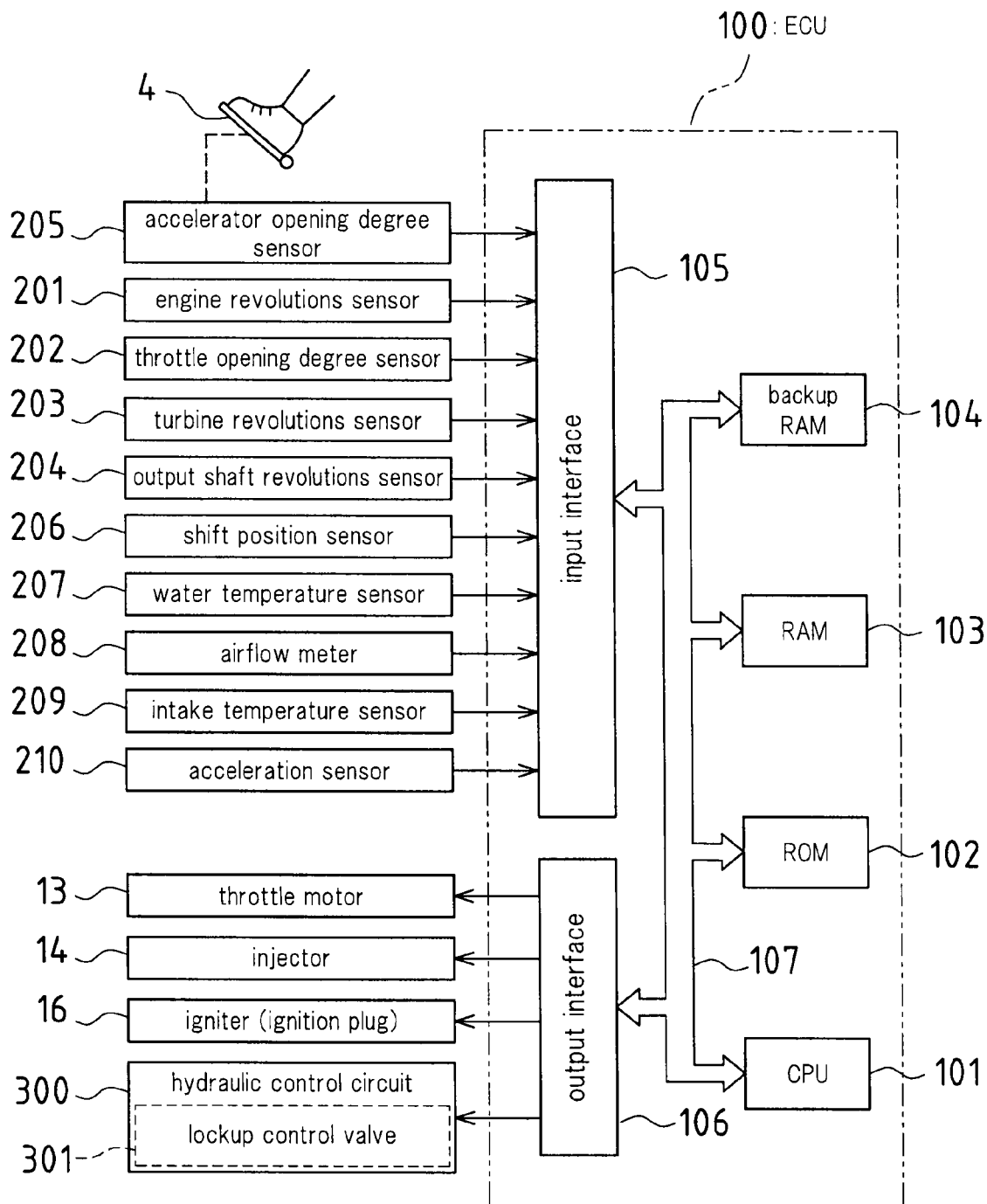

The ECU 100, as shown in FIG. 6, is provided with a CPU 101, a ROM 102, a RAM 103, a backup RAM 104, and so forth.

Various programs or the like are stored in the ROM 102, including programs for executing control related to basic driving of the vehicle, and also programs for executing gearshift control that sets the gear of the automatic transmission 3 according to the vehicle running state. The specific content of this gearshift control will be described later.

The CPU 101 executes various computational processing based on the various control programs and maps stored in the ROM 102. The RAM 103 is a memory that temporarily stores the results of computational processing with the CPU 101, data that has been input from sensors, and so forth. The backup RAM 104 is a nonvolatile memory that stores data or the like to be saved when stopping the engine 1.

The CPU 101, the ROM 102, the RAM 103, and the backup RAM 104 are connected to each other via a bus 107, and are connected to an input interface 105 and an output interface 106.

The engine revolutions sensor 201, the throttle opening degree sensor 202, the turbine revolutions sensor 203, the output shaft revolutions sensor 204, an accelerator opening degree sensor 205 that detects the opening degree of an accelerator pedal 4, the shift position sensor 206, the water temperature sensor 207, the airflow meter 208, the intake temperature sensor 209, an acceleration sensor 210 that detects acceleration in the front-rear direction and the left-right direction of the vehicle, and so forth are connected to the input interface 105, and signals from each of these sensors are input to the ECU 100.

The throttle motor 13 of the throttle valve 12, the injector 14, the igniter 16 of the ignition plug 15, the hydraulic control circuit 300, and so forth are connected to the output interface 106.

The ECU 100, based on the output signals of the various sensors above, executes various control of the engine 1, including control of the opening degree of the throttle valve 12 of the engine 1, control of ignition timing (control of driving of the igniter 16), control of the fuel injection amount (control of opening/closing of the injector 14), and so forth.

Also, the ECU 100 outputs a solenoid control signal (hydraulic command signal) that sets the gear of the automatic transmission 3 to the hydraulic control circuit 300. Based on this solenoid control signal, excitement/non-excitement or the like of a linear solenoid valve or on-off solenoid valve of the hydraulic control circuit 300 is controlled to engage or release the clutches C1 to C4, the brakes B1 to B4, the one-way clutches F0 to F3, and so forth of the automatic transmission 3 in a predetermined state, so as to configure a predetermined gear (1st to 6th gear).

Furthermore, the ECU 100 outputs a lockup clutch control signal (hydraulic command signal) to the hydraulic control circuit 300. Based on this lockup clutch control signal, a lockup control valve 301 or the like of the hydraulic control circuit 300 is controlled so that the lockup clutch 25 of the torque converter 2 is engaged, half-engaged, or released.

Following is a description of "gearshift control", "lockup control", and "gearshift control in the manual gearshift mode" that are executed by the above ECU 100.

—Gearshift Control—

First, a gearshift map used in the gearshift control of this example will be described with reference to FIG. 7.

Figure 7:
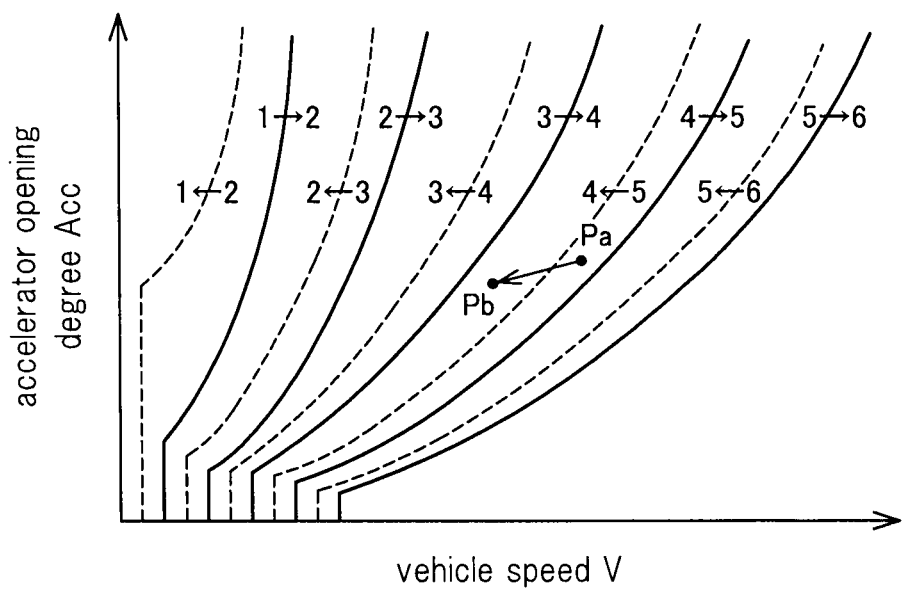
FIG. 7 shows an example of a map used for gearshift control.

The gearshift map shown in FIG. 7 is a map in which are set a plurality of regions for, using a vehicle speed V and an accelerator opening degree Acc as parameters, calculating an appropriate gear (gear in which optimal fuel consumption is obtained) according to the vehicle speed V and the accelerator opening degree Acc. This gearshift map is stored in the ROM 102 of the ECU 100. The regions of the gearshift map are demarcated by a plurality of gearshift lines (gear switching lines).

In the gearshift map shown in FIG. 7, upshift lines (gearshift lines) are indicated by solid lines, and downshift lines (gearshift lines) are indicated by broken lines. Also, the respective switching directions of upshifts and downshifts are indicated using numerals and arrows in FIG. 7.

Next is a description of basic operation of the gearshift control.

The ECU 100 calculates a vehicle speed V based on an output signal of the output shaft revolutions sensor 204, calculates an accelerator opening degree Acc from an output signal of the accelerator opening degree sensor 205, refers to the gearshift map in FIG. 7 to calculate a target gear based on the vehicle speed V and the accelerator opening degree Acc, and determines whether or not a gearshift operation is necessary by comparing that target gear to the current gear.

Based on the result of that determination, when a gearshift is not necessary (when the target gear and the current gear are the same, so the gear is appropriately set), a solenoid control signal (hydraulic command signal) that maintains the current gear is output to the hydraulic control circuit 300.

On the other hand, when the target gear and the current gear are different, gearshift control is performed. For example, in a case where the vehicle running state has changed from a circumstance in which the vehicle is running with the gear of the automatic transmission 3 in "5th", i.e., there has been a change from point Pa to point Pb shown in FIG. 7 for example, because this change crosses over a downshift gearshift line [5→4], the target gear calculated from the gearshift map is "4th", so a solenoid control signal (hydraulic command signal) that sets 4th gear is output to the hydraulic control circuit 300, and a gearshift from 5th gear to 4th gear (5→4 downshift gearshift) is performed.

—Lockup Control—

An engagement map used for lockup control in this example will be described with reference to FIG. 8.

Figure 8:
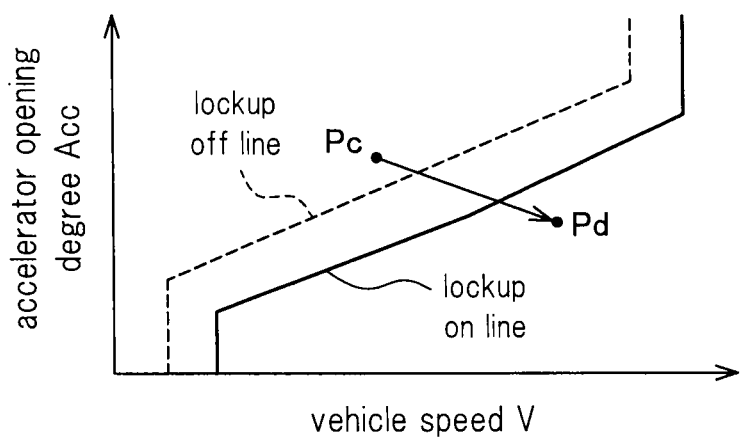
FIG. 8 shows an example of a map used for lockup control.

The engagement map shown in FIG. 8 is a map in which are set regions (an on region and an off region) for, using the vehicle speed V and the accelerator opening degree Acc as parameters, determining to engage or release the lockup clutch 25 according to the vehicle speed V and the accelerator opening degree Acc. This engagement map is stored in the ROM 102 of the ECU 100.

In the engagement map shown in FIG. 8, a lockup on line is indicated by a solid line, and a lockup off line is indicated by a broken line. The lockup on line (solid line) and the lockup off line (broken line) are set having a predetermined hysteresis. Hysteresis is set this way in order to prevent hunting. Also, in the engagement map shown in FIG. 8, the lockup on line and the lockup off line are set so as to obtain optimal fuel consumption according to the vehicle speed V and the accelerator opening degree Acc.

The ECU 100 engages or releases the lockup clutch 25 with reference to the engagement map in FIG. 8, based on the vehicle speed V and the accelerator opening degree Acc obtained from the respective output signals of the output shaft revolutions sensor 204 and the accelerator opening degree sensor 205.

Specifically, in a case where, in a state in which the lockup clutch 25 is released (off), the vehicle speed V changes to the high vehicle speed side, or the accelerator opening degree Acc changes to the low accelerator opening degree side, thus crossing the lockup on line (solid line) (e.g., when changing from Pc to Pd (lockup off→on) shown in FIG. 8), lockup on is determined and so the lockup clutch 25 is engaged.

On the other hand, in a case where, in a state in which the lockup clutch 25 is engaged (on), the vehicle speed V changes to the low vehicle speed side, or the accelerator opening degree changes to the high accelerator opening degree side, thus crossing the lockup off line (broken line) (lockup on→off), the above-described lockup off is determined and so the lockup clutch 25 is released.

—Gearshift Control In Manual Gearshift Mode (1)—

A feature of this example is that when there is a downshift request in the manual gearshift mode, if the vehicle speed (output shaft revolutions) at the time of the downshift request is less than a downshift allowable vehicle speed, control that allows a downshift of the automatic transmission 3 is executed, and the downshift allowable vehicle speed (downshift allowable output shaft revolutions) is variably set.

Figure 9:
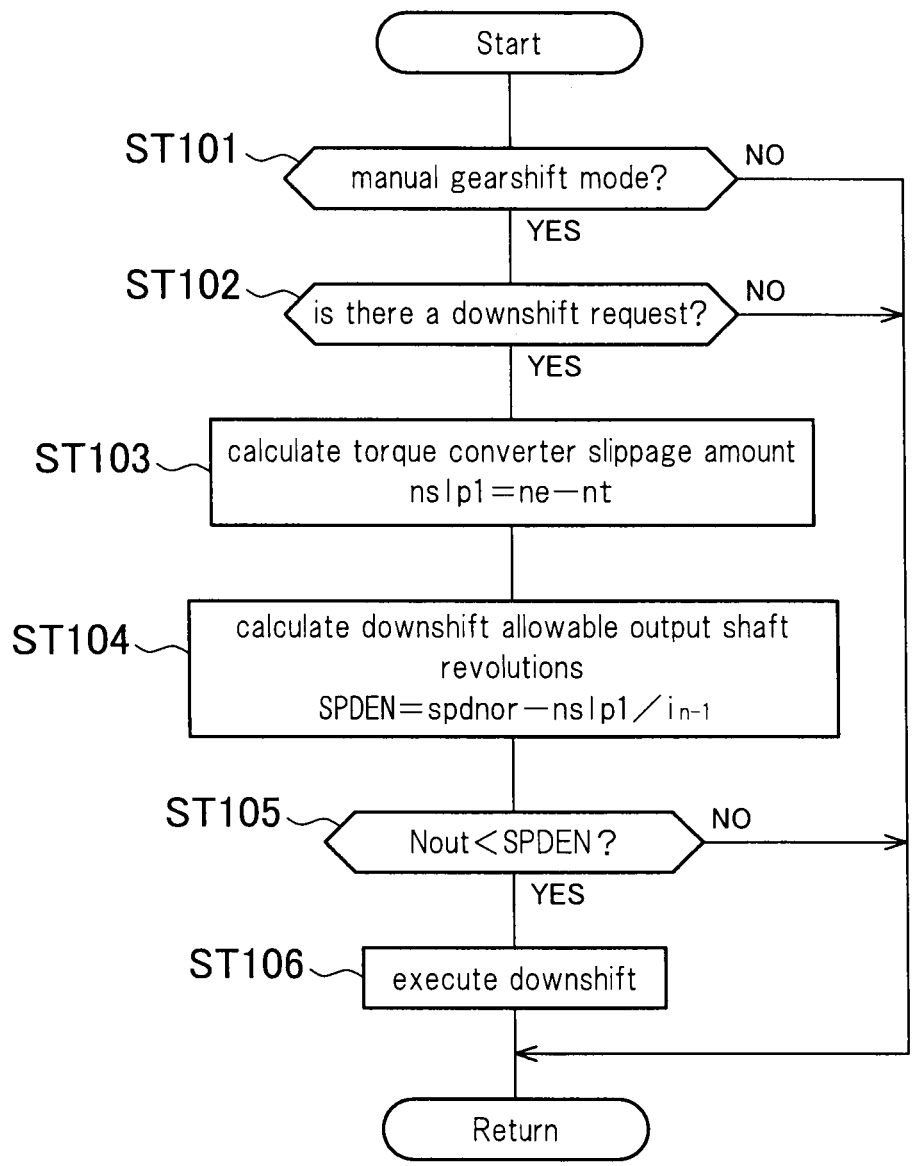
FIG. 9 is a flowchart that shows an example of gearshift control in a manual gearshift mode executed by the ECU.

An example of this specific control will be described with reference to the flowchart shown in FIG. 9. The control routine shown in FIG. 9 is repeatedly executed at each instance of a predetermined period by the ECU 100.

In Step ST101, a determination is made of whether or not the present gearshift mode is the manual gearshift mode based on the output signal of the shift position sensor 206, and when the result of that determination is affirmative, the routine proceeds to Step ST102. When the result of the determination in Step ST101 is negative, the routine returns.

In Step ST102, a determination is made of whether or not a downshift request of the automatic transmission 3 is occurring. Specifically, a determination is made of whether or not the shift lever 51 has been operated to the downshift (−) position (see FIG. 5) of the S position 52 based on the output signal of the shift position sensor 206, and when the result of that determination is affirmative, the routine proceeds to Step ST103. When the result of the determination in Step ST102 is negative, the routine returns.

In Step ST103, the engine revolutions Ne are calculated from the output signal of the engine revolutions sensor 201, the turbine revolutions Nt are calculated from the output signal of the turbine revolutions sensor 203, and a torque converter slippage amount nslp1 (Ne−Nt), which is the difference in rotation between the engine revolutions Ne and the turbine revolutions Nt, is calculated.

Next, in Step ST104, final downshift allowable output shaft revolutions SPDEN are calculated. Specifically, the present torque converter slippage amount nslp1 calculated in Step ST103, a reference downshift allowable output shaft revolutions spdnor described later, and a gear ratio $i_{n-1}$ of the automatic transmission 3 after the downshift are used to calculate the final downshift allowable output shaft revolutions SPDEN based on below computational formula (1).

$$SPDEN = spdnor - nslp1/i_{n-1} \quad (1)$$

Figure 12:
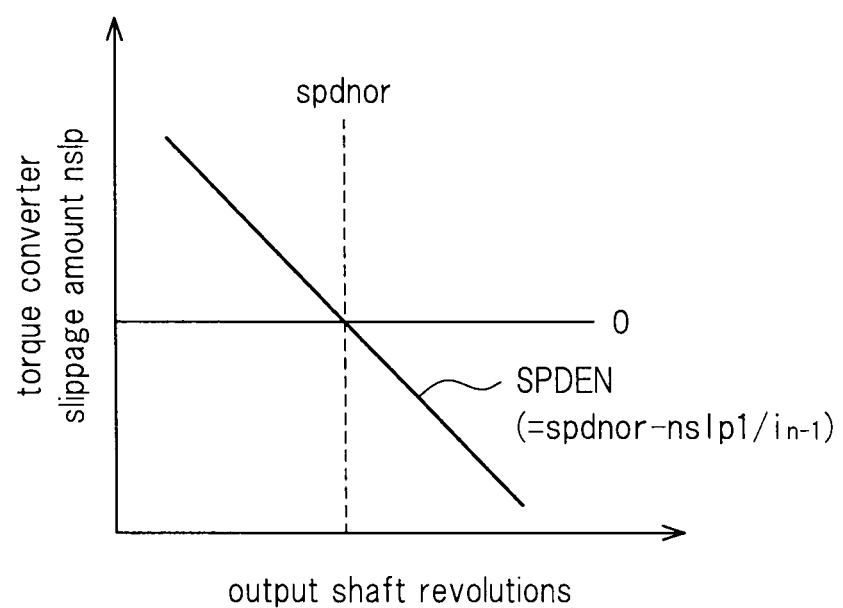
FIG. 12 shows a graph that indicates the relationship between a torque converter slippage amount nslp, a reference downshift allowable vehicle speed spdnor, and a downshift allowable vehicle speed SPDEN.

When expressed in a graph, the relationship of the torque converter slippage amount nslp, the reference downshift allowable output shaft revolutions spdnor, and the downshift allowable output shaft revolutions SPDEN is as shown in FIG. 12.

Then in Step ST105, a determination is made of whether or not present output shaft revolutions Nout calculated from the output signal of the output shaft revolutions sensor 204 are less than the final downshift allowable output shaft revolutions SPDEN calculated in above Step ST104, and when the result of that determination is affirmative (Nout<SPDEN), a downshift of the automatic transmission 3 is executed (Step ST106). When the result of the determination in Step ST105 is negative, the routine returns without executing a downshift of the automatic transmission 3.

Next, problem-solving principles of the invention in this example will be described with reference to FIGS. 10 and 11.

Even in a state in which the vehicle speed V and the vehicle acceleration G are the same, the margin relative to engine over-revving differs according to the size of the torque converter slippage amount nslp. This point will be specifically described.

Figure 10:
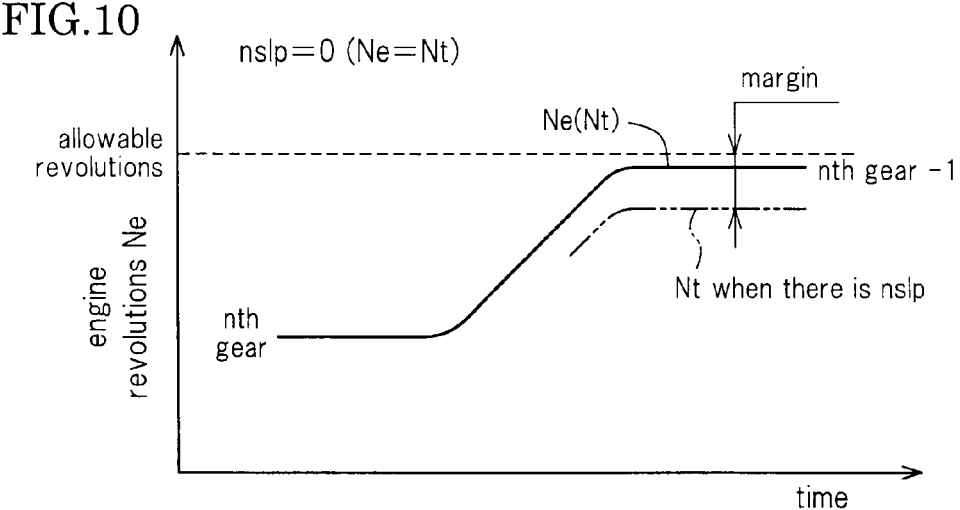
FIG. 10 is a timing chart that shows an example of changes in an engine revolutions Ne when downshifting.
Figure 11:
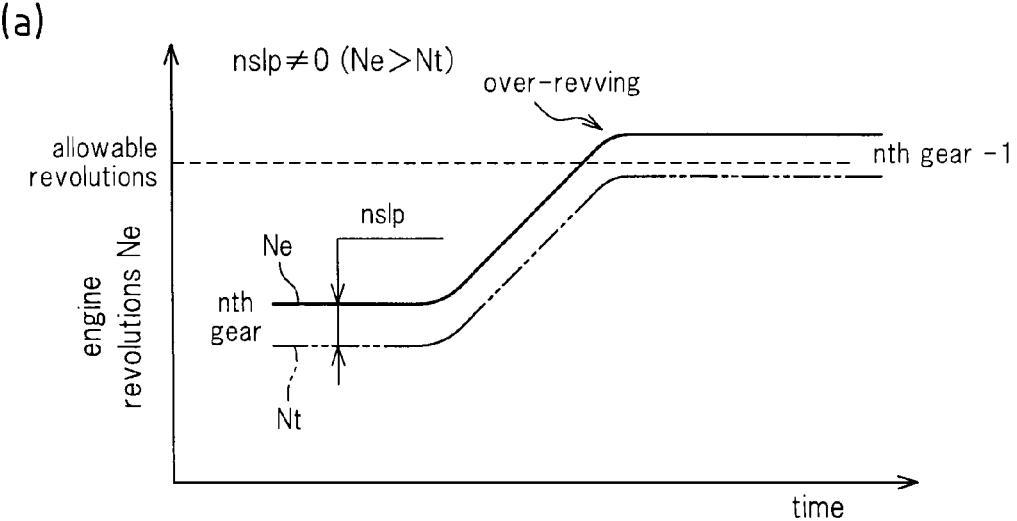
FIG. 11 includes FIGS. 11A and 11B, where
Figure 11:
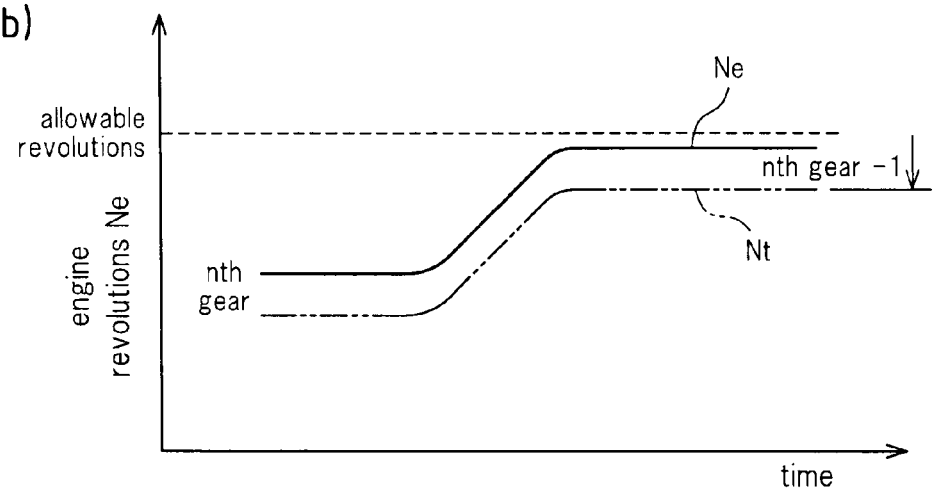

First, when there is no slippage in the torque converter 2 (slippage amount nslp=0), because the engine revolutions Ne and the turbine revolutions Nt are the same (Ne=Nt), engine over-revving does not occur, even if the turbine revolutions Nt after a downshift (nth gear−1) become nearly the engine allowable revolutions, as shown in FIG. 10.

On the other hand, even if the vehicle speed V and the vehicle acceleration G are the same, and the turbine revolutions Nt prior to a downshift (nth) are the same as in the case of FIG. 10, when there is slippage in the torque converter 2 (slippage amount nslp≠0), the engine revolutions Ne are larger than the turbine revolutions Nt (Ne>Nt), so when the turbine revolutions Nt increase to nearly the engine allowable revolutions, as shown in FIG. 11A, over-revving of the engine revolutions Ne occurs after a downshift. In order to avoid this, it is necessary to reduce the turbine revolutions Nt after the downshift (see FIG. 11B), and to the extent that the turbine revolutions Nt are reduced, it is necessary to increase the margin relative to engine over-revving (see FIG. 10).

In this way, the margin relative to engine over-revving differs according to the size of the torque converter slippage amount nslp, so when the torque converter slippage amount nslp is small (or when the slippage amount nslp=0), even if the amount of allowance for the above margin is reduced in comparison to a case in which the torque converter slippage amount nslp is large (see FIG. 10), engine over-revving can be prevented. In other words, when the torque converter slippage amount nslp is small, it is possible to set the downshift allowable vehicle speed in the manual gearshift mode further to the high speed side than when the torque converter slippage amount nslp is large.

With focus on such points, in this example, a more appropriate downshift allowable vehicle speed in the manual gearshift mode is achieved by variably setting the downshift allowable vehicle speed according to the torque converter slippage amount nslp.

Specifically, as described above, the downshift allowable vehicle speed when the torque converter slippage amount nslp is 0 is prescribed by the output shaft revolutions Nout, and that value is used as the reference downshift allowable output shaft revolutions spdnor. Also, by setting the present torque converter slippage amount to nslp1, setting the gear ratio of the automatic transmission 3 after a downshift to $i_{n-1}$, and calculating the final downshift allowable output shaft revolutions SPDEN using the above computational formula (1), the downshift allowable output shaft revolutions SPDEN are variably set according to the torque converter slippage amount nslp. By such setting, it is possible to set an appropriate downshift allowable output shaft revolutions (downshift allowable vehicle speed) according to the actual torque converter slippage amount nslp, so it is possible to more effectively expand the downshift allowable region when the manual gearshift mode is selected.

In this example, the downshift allowable vehicle speed is prescribed by the output shaft revolutions of the automatic transmission 3 corresponding to the vehicle speed, but the downshift allowable vehicle speed may also be calculated directly.

In this case, a configuration may be adopted in which, with the downshift allowable vehicle speed when the torque converter slippage amount nslp is 0 set as a reference downshift allowable vehicle speed, using that reference downshift allowable vehicle speed and the gear ratio of the automatic transmission 3 after a downshift, a downshift allowable vehicle speed correction amount is calculated based on the present torque converter slippage amount nslp and the gear ratio after a downshift, and a value obtained by subtracting the downshift allowable vehicle speed correction amount from the reference downshift allowable vehicle speed is set as the downshift allowable vehicle speed.

Also, the final downshift allowable vehicle speed may be calculated by incorporating a final reduction ratio from the automatic transmission 3 to the drive wheels and a wheel diameter (wheel radius) into the above computational formula (1).

Next is a description of other examples (2) to (5) of the gearshift control in the manual gearshift mode executed by the ECU 100.

—Gearshift Control In Manual Gearshift Mode (2)—

Figure 13:
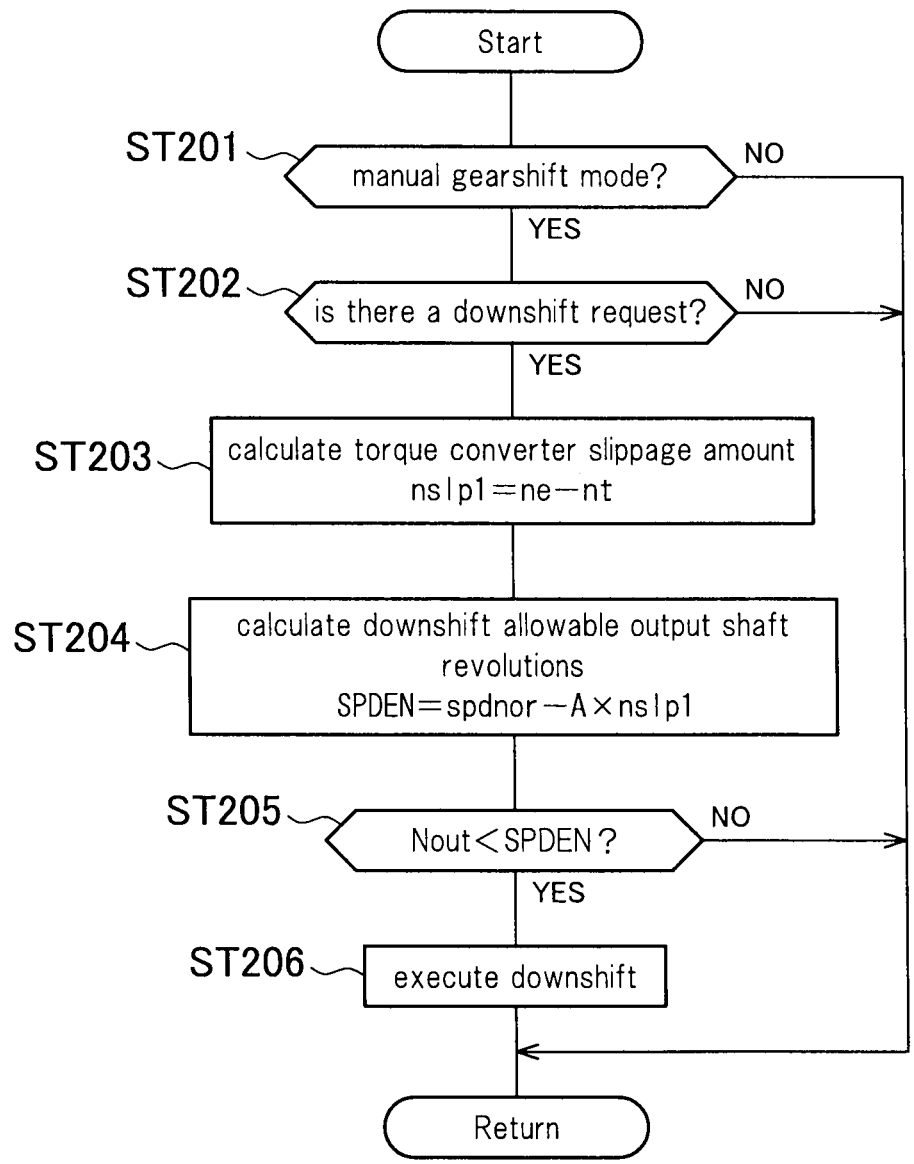
FIG. 13 is a flowchart that shows another example of gearshift control in the manual gearshift mode that is executed by the ECU.

Another example of the gearshift control when in the manual gearshift mode will be described with reference to the flowchart in FIG. 13. The control routine in FIG. 13 is executed repeatedly at each instance of a predetermined period by the ECU 100.

The processing in Steps ST201 to ST203 is the same as in Steps ST101 to ST103 in FIG. 9. That is, when the present gearshift mode is the manual gearshift mode, and there has been a downshift request in the manual gearshift mode (when the result of the determination is affirmative in both Steps ST201 and ST202), the torque converter slippage amount nslp1 (Ne−Nt), which is the difference in rotation between the engine revolutions Ne and the turbine revolutions Nt, is calculated (Step ST203).

Next, in Step ST204, the final downshift allowable output shaft revolutions SPDEN are calculated. Specifically, the present torque converter slippage amount nslp1 calculated in Step ST203, the reference downshift allowable output shaft revolutions spdnor (the downshift allowable vehicle speed when the torque converter slippage amount nslp is 0), and a downshift allowable output shaft revolutions correction coefficient A described later are used to calculate the final downshift allowable output shaft revolutions SPDEN based on below computational formula (2).

$$\text{SPDEN} = \text{spdnor} - A \times \text{nslp1} \quad (2)$$

Then, in Step ST205, a determination is made of whether or not the present output shaft revolutions Nout calculated from the output signal of the output shaft revolutions sensor 204 are less than the final downshift allowable output shaft revolutions SPDEN calculated in above Step ST204, and when the result of that determination is affirmative (Nout<SPDEN), a downshift of the automatic transmission 3 is executed (Step ST206). When the result of the determination in Step ST205 is negative, the routine returns without executing a downshift of the automatic transmission 3.

In the gearshift control when in the manual gearshift mode of this example as well, the downshift allowable output shaft revolutions (downshift allowable vehicle speed) are variably set according to the torque converter slippage amount nslp, so more appropriate downshift allowable output shaft revolutions in the manual gearshift mode are achieved. Thus, while preventing engine over-revving, it is possible to expand the downshift allowable region when the manual gearshift mode is selected. As a result, it is possible to achieve an improvement in vehicle operability.

In this example, the downshift allowable output shaft revolutions correction coefficient A used for calculation of the final downshift allowable output shaft revolutions SPDEN is set to a value adapted according to testing, calculation, and so forth, in consideration of the relationship of the torque converter slippage amount nslp and the margin relative to engine over-revving described in the above "Gearshift Control In Manual Gearshift Mode (1)".

Incidentally, the margin relative to engine over-revving differs according to the size of the vehicle acceleration even when the torque converter slippage amount nslp is the same. This point will be described with reference to FIG. 14.

Figure 14:
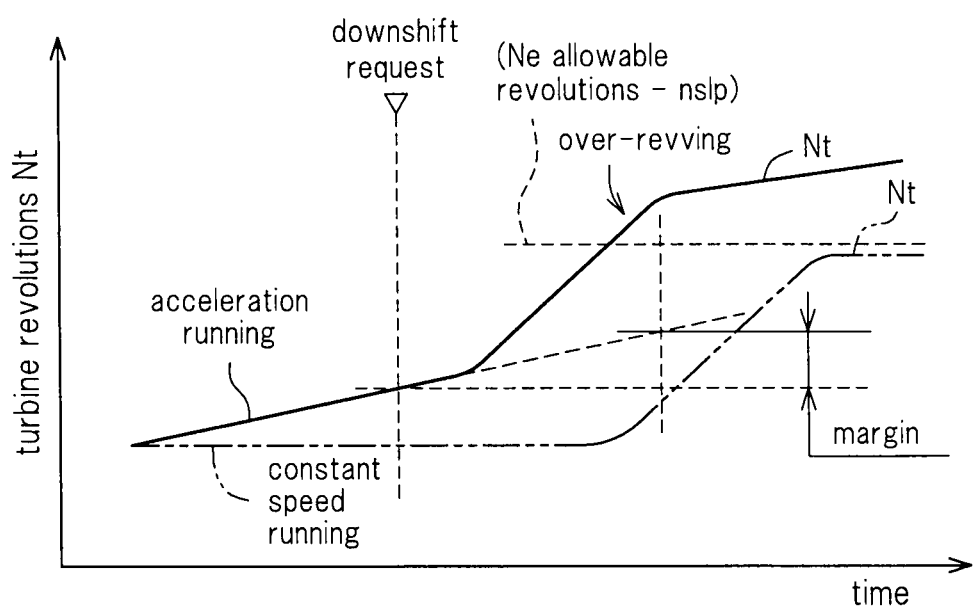
FIG. 14 is a timing chart that shows an example of changes in the turbine revolutions Nt in a case where a downshift has been executed when running with acceleration and when running at a constant speed.

First, for example, when the vehicle is running in a state of acceleration over flat ground, the vehicle operating state changes during the time from the downshift request to completion of the gearshift. For example, as shown in FIG. 14, the turbine revolutions Nt change (increase) along with an increase in vehicle speed during a downshift gearshift in acceleration running, so the turbine revolutions Nt become greater at the time when the gearshift is completed, relative to the turbine revolutions Nt when the downshift request occurred. Therefore, when determining whether a downshift is allowed in the operating state at the time of the downshift request, there is a possibility that over-revving of the engine revolutions Ne will occur, so it is necessary to set a lower downshift allowable vehicle speed with allowance for the margin, as shown in FIG. 14. Moreover, it is necessary to allow for a larger margin as the vehicle acceleration increases.

On the other hand, when running at a fixed speed on a road going up a hill, the turbine revolutions Nt do not change very much from the time of the downshift request to immediately before the gearshift is completed (see double-dotted chained line in FIG. 14), so it is not necessary to allow for the above margin. Also, for the same reason, it is possible to set a smaller margin as the vehicle acceleration becomes less. That is, it is possible to set a higher downshift allowable vehicle speed as the vehicle acceleration becomes less.

In consideration of such points, the downshift allowable output shaft revolutions correction coefficient A may be variably set according to the vehicle acceleration. Specifically, the vehicle acceleration G is calculated from the output signal of the acceleration sensor 210, and the downshift allowable output shaft revolutions correction coefficient A is calculated with reference to the map shown in FIG. 15 based on the calculated vehicle acceleration G. With this sort of correction, it is possible to set appropriate downshift allowable output shaft revolutions (downshift allowable vehicle speed) that reflect fluctuation of the torque converter slippage amount nslp during a downshift gearshift, so it is possible to more effectively expand the downshift allowable region when the manual gearshift mode is selected.

Figure 15:
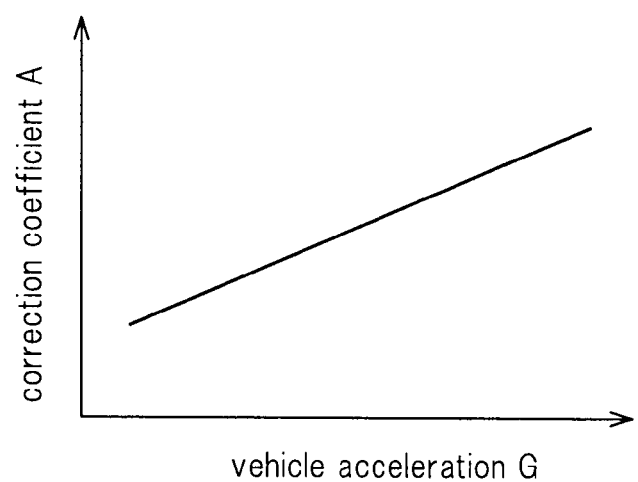
FIG. 15 shows an example of a map that calculates a downshift allowable output shaft revolutions correction coefficient.

In the map shown in FIG. 15, values of the downshift allowable output shaft revolutions correction coefficient A adapted according to testing, calculation, and so forth are converted to a map, in consideration of the above fluctuation of the turbine revolutions Nt in a downshift and so forth, using vehicle acceleration as a parameter. This map is stored in the ROM 102 of the ECU 100. In the map in FIG. 15, the downshift allowable output shaft revolutions correction coefficient A is set smaller as the vehicle acceleration G decreases.

The method as described above for variably setting the downshift allowable output shaft revolutions (downshift allowable vehicle speed) according to the vehicle acceleration G is also applicable to the above "Gearshift Control In Manual Gearshift Mode (1)". Specifically, a correction coefficient that changes according to the vehicle acceleration G may be multiplied by the second term "nslp1/$i_{n-1}$" on the right side of the above computational formula (1).

Also, in this example, the downshift allowable vehicle speed is prescribed by the output shaft revolutions of the automatic transmission 3 corresponding to the vehicle speed, but the downshift allowable vehicle speed may also be calculated directly.

In this case, a configuration may be adopted in which, with the downshift allowable vehicle speed when the torque converter slippage amount nslp is 0 set as a reference downshift allowable vehicle speed, using that reference downshift allowable vehicle speed and a downshift allowable vehicle speed correction coefficient A', a downshift allowable vehicle speed correction amount is calculated by multiplying the downshift allowable vehicle speed correction coefficient A' by the present torque converter slippage amount nslp, and a value obtained by subtracting the downshift allowable vehicle speed correction amount from the reference downshift allowable vehicle speed is set as the downshift allowable vehicle speed.

Also, the final downshift allowable vehicle speed may be calculated by incorporating a final reduction ratio from the automatic transmission 3 to the drive wheels and a wheel diameter (wheel radius) into the above computational formula (2).

—Gearshift Control In Manual Gearshift Mode (3)—

Figure 16:
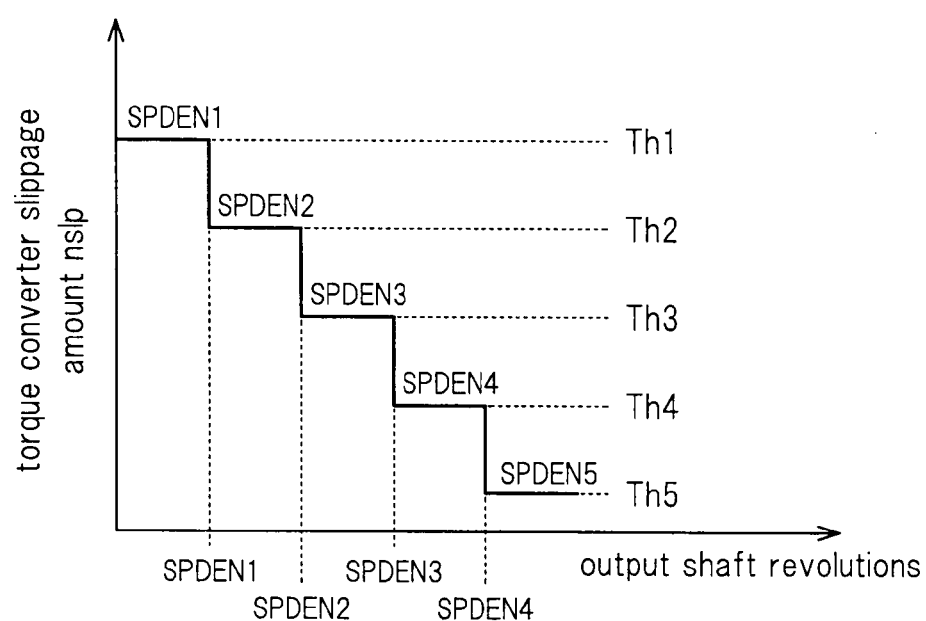
FIG. 16 shows an example of a map that calculates a downshift allowable output shaft revolutions SPDEN.

A feature of this example is that the final downshift allowable output shaft revolutions SPDEN are calculated using the map shown in FIG. 16.

In the map shown in FIG. 16, a plurality (five) of threshold values Th1, Th2, Th3, Th4, and Th5 (Th1>Th2>Th3>Th4>Th5) are set in steps relative to the torque converter slippage amount nslp, and downshift allowable output shaft revolutions SPDEN1, SPDEN2, SPDEN3, SPDEN4, and SPDEN5 are set for the respective threshold values Th1 to Th5, so as to become smaller as the threshold values Th1 to Th5 become larger.

In the map in FIG. 16, the downshift allowable output shaft revolutions are "SPDEN2" when the torque converter slippage amount nslp is, for example, in a range of "Th3<nslp≦Th2", and are "SPDEN4" when the torque converter slippage amount nslp is in a range of "Th5<nslp≦Th4". When the torque converter slippage amount nslp is no more than the threshold value Th5 (nslp≦Th5), the downshift allowable output shaft revolutions are "SPDEN5".

In the map in FIG. 16, values of the threshold values Th1 to Th5 and the downshift allowable output shaft revolutions SPDEN1 to SPDEN5 adapted according to testing, calculation, and so forth are converted to a map, in consideration of the relationship of the torque converter slippage amount nslp and the margin relative to engine over-revving described in the above "Gearshift Control In Manual Gearshift Mode (1)", using the torque converter slippage amount nslp as a parameter. This map is stored in the ROM 102 of the ECU 100.

Figure 17:
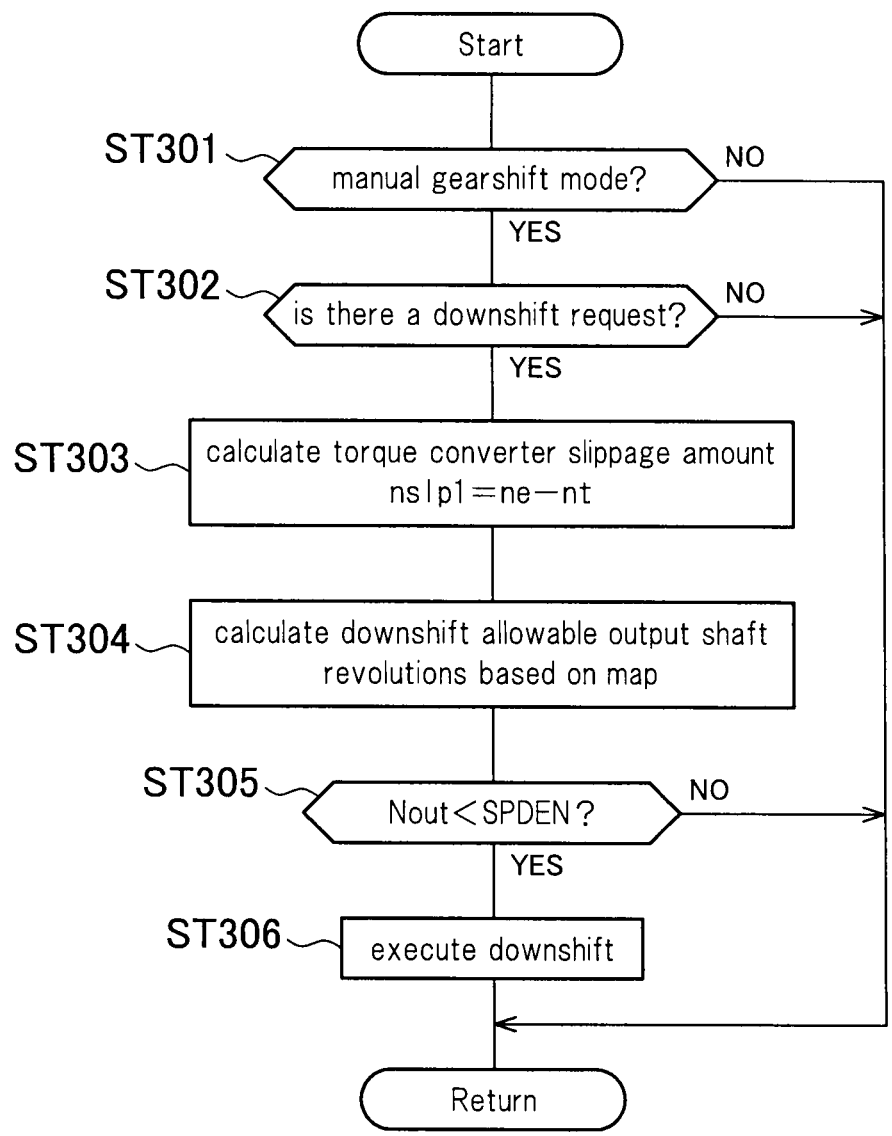
FIG. 17 is a flowchart that shows another example of gearshift control in the manual gearshift mode that is executed by the ECU.

Next, the gearshift control when in the manual gearshift mode in this example will be described with reference to the flowchart in FIG. 17. The control routine in FIG. 17 is executed repeatedly at each instance of a predetermined period by the ECU 100.

The processing in Steps ST301 to ST303 is the same as in Steps ST101 to ST103 in FIG. 9. That is, when the present gearshift mode is the manual gearshift mode, and there has been a downshift request in the manual gearshift mode (when the result of the determination is affirmative in both Steps ST301 and ST302), the torque converter slippage amount nslp1 (Ne−Nt), which is the difference in rotation between the engine revolutions Ne and the turbine revolutions Nt, is calculated (Step ST303).

Next, in Step ST304, the final downshift allowable output shaft revolutions SPDEN are calculated. Specifically, the final downshift allowable output shaft revolutions SPDEN are read by referring to the map in FIG. 16, using the present torque converter slippage amount nslp1 calculated in Step ST303. For example, "SPDEN2" is read when the torque converter slippage amount nslp1 is in a range of "Th3<nslp≦Th2".

Then, in Step ST305, a determination is made of whether or not the present output shaft revolutions Nout calculated from the output signal of the output shaft revolutions sensor 204 are less than the final downshift allowable output shaft revolutions SPDEN calculated in above Step ST304, and when the result of that determination is affirmative (Nout<SPDEN), a downshift of the automatic transmission 3 is executed (Step ST306). When the result of the determination in Step ST305 is negative, the routine returns without executing a downshift of the automatic transmission 3.

In the gearshift control when in the manual gearshift mode of this example as well, the downshift allowable output shaft revolutions (downshift allowable vehicle speed) are variably set according to the torque converter slippage amount nslp, so more appropriate downshift allowable output shaft revolutions in the manual gearshift mode can be achieved. Thus, while preventing engine over-revving, it is possible to expand the downshift allowable region when the manual gearshift mode is selected. As a result, it is possible to achieve an improvement in vehicle operability.

Also, in this example, the downshift allowable vehicle speed is prescribed by the output shaft revolutions of the automatic transmission 3 corresponding to the vehicle speed, but this is not a limitation. For example, a configuration may be adopted in which a map used to calculate the downshift allowable vehicle speed is created using the torque converter slippage amount nslp as a parameter, and the downshift allowable vehicle speed is variably set by referring to the map, based on the present torque converter slippage amount nslp.

—Gearshift Control In Manual Gearshift Mode (4)—

Figure 18:
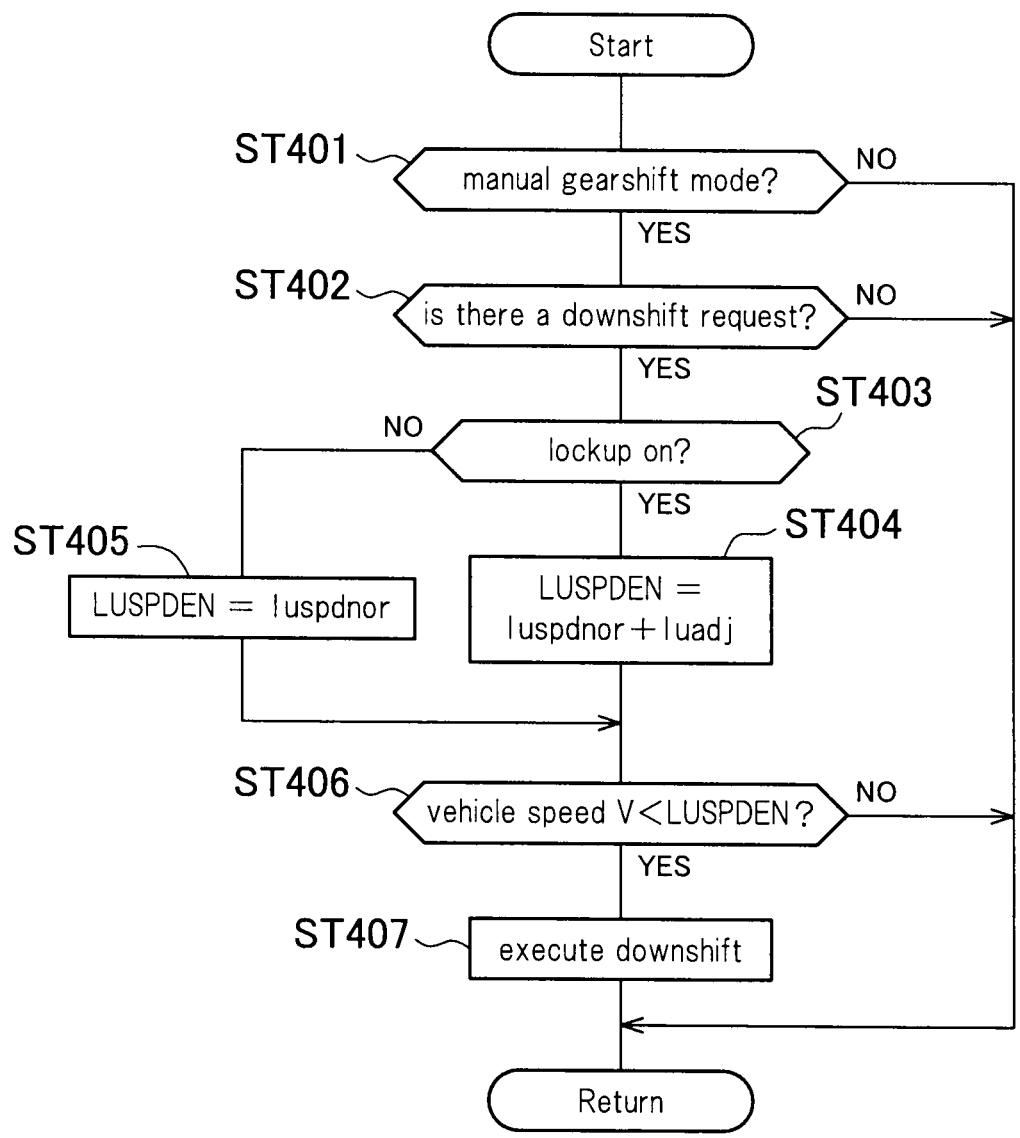
FIG. 18 is a flowchart that shows another example of gearshift control in the manual gearshift mode that is executed by the ECU.

Another example of the gearshift control when in the manual gearshift mode will be described with reference to the flowchart in FIG. 18. The control routine in FIG. 18 is executed repeatedly at each instance of a predetermined period by the ECU 100.

In Step ST401, a determination is made of whether or not the present gearshift mode is the manual gearshift mode based on the output signal of the shift position sensor 206, and when the result of that determination is affirmative, the routine proceeds to Step ST402. When the result of the determination in Step ST401 is negative, the routine returns.

In Step ST402, a determination is made of whether or not a downshift request of the automatic transmission 3 is occurring. Specifically, a determination is made of whether or not the shift lever 51 has been operated to the downshift (−) position of the S position 52 based on the output signal of the shift position sensor 206, and when the result of that determination is affirmative, the routine proceeds to Step ST403. When the result of the determination in Step ST402 is negative, the routine returns.

In Step ST403, a determination is made of whether or not the lockup clutch 25 is in a lockup on state. Specifically, the engine revolutions Ne are calculated from the output signal of the engine revolutions sensor 201, the turbine revolutions Nt are calculated from the output signal of the turbine revolutions sensor 203, and the torque converter slippage amount nslp (Ne−Nt), which is the difference in rotation between the engine revolutions Ne and the turbine revolutions Nt, is calculated. When the calculated torque converter slippage amount nslp is 0 (slippage amount nslp=0), the lockup clutch 25 is determined to be in a lockup on state, and the routine proceeds to Step ST404. On the other hand, when the calculated torque converter slippage amount nslp is not 0 (slippage amount nslp≠0), the lockup clutch 25 is determined to be in a lockup off state, and the routine proceeds to Step ST405.

In Step ST404, using a reference downshift allowable vehicle speed luspdnor and a vehicle speed correction amount luadj that are described below, a final downshift allowable vehicle speed LUSPDEN (LUSPDEN=luspdnor+luadj) is calculated by adding the vehicle speed correction amount luadj to the reference downshift allowable vehicle speed luspdnor. On the other hand, in Step ST405, the reference downshift allowable vehicle speed luspdnor is set as the final downshift allowable vehicle speed LUSPDEN (LUSPDEN=luspdnor).

When the lockup clutch 25 is in a lockup on state and so the determination in Step ST403 is affirmative, in Step ST406, the vehicle speed V is calculated based on the output signal of the output shaft revolutions sensor 204, a determination is made of whether or not that vehicle speed V is less than the final downshift allowable vehicle speed LUSPDEN calculated in Step ST404, and when the result of that determination is affirmative (vehicle speed V<LUSPDEN), a downshift of the automatic transmission 3 is executed (Step ST407). When the result of the determination in Step ST406 is negative, the routine returns without executing a downshift of the automatic transmission 3.

On the other hand, when the lockup clutch 25 is in a lockup off state and so the determination in Step ST403 is negative, in Step ST406, a determination is made of whether or not the above vehicle speed V is less than the final downshift allowable vehicle speed LUSPDEN calculated in above Step ST405, and when the result of that determination is affirmative (vehicle speed V<LUSPDEN), a downshift of the automatic transmission 3 is executed (Step ST407). When the result of the determination in Step ST406 is negative, the routine returns without executing a downshift of the automatic transmission 3.

The reference downshift allowable vehicle speed luspdnor and the vehicle speed correction amount luadj used in this example are stored in the ROM 102 of the ECU 100.

Next, problem-solving principles of the invention in this example will be described with reference to FIGS. 19A and 19B.

Even in a state in which the vehicle speed V and the vehicle acceleration G are the same, the margin relative to engine over-revving may differ according to the lockup state of the lockup clutch 25, i.e., according to whether the lockup clutch 25 is in a lockup on state or a lockup off state. This point will be specifically described.

Figure 19:
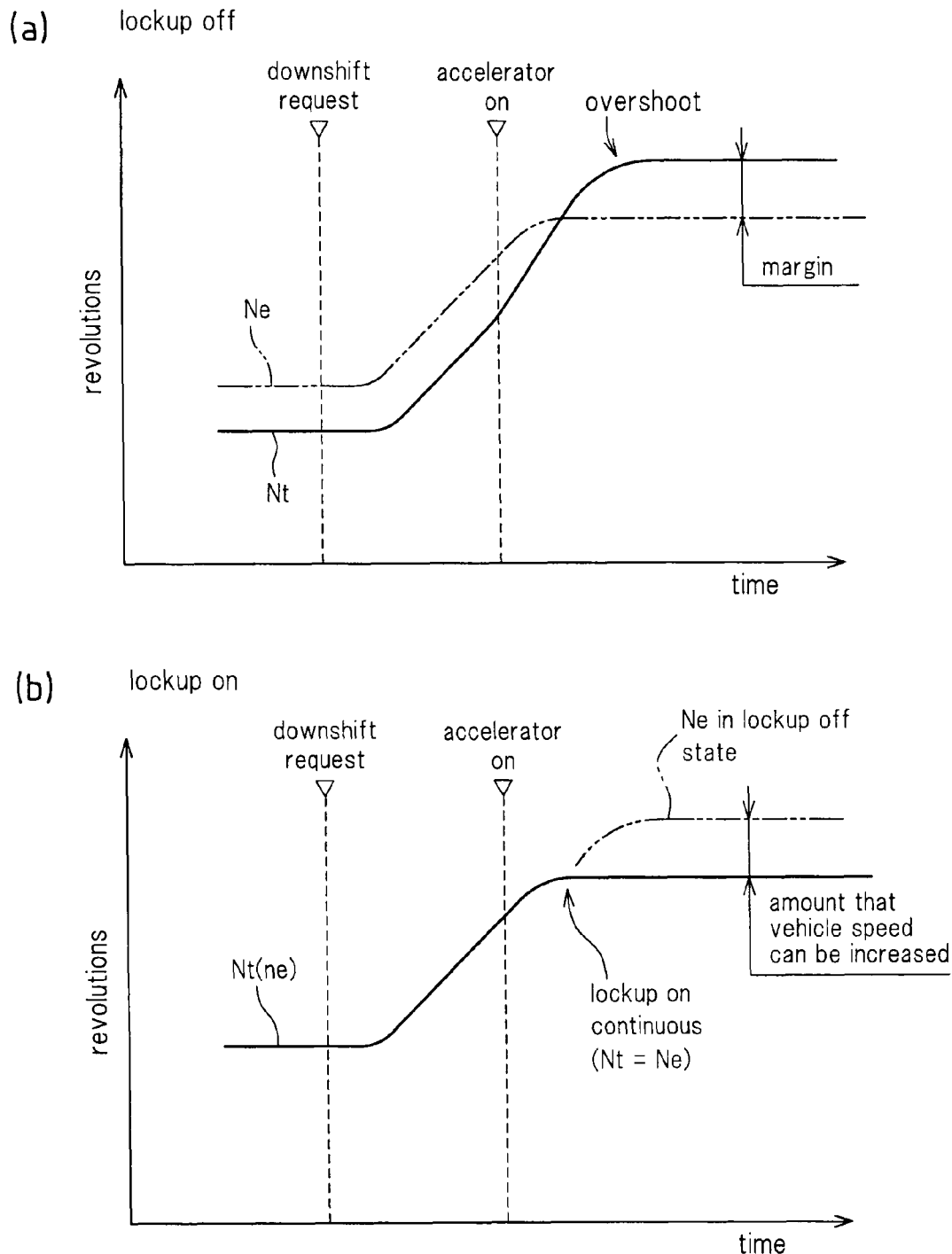
FIG. 19 includes FIGS. 19A and 19B, where

First, when, for example, operation of acceleration off/downshifting and then afterward again accelerating (acceleration on) is executed in a lockup off state, as shown in FIG. 19A, after an acceleration on state is established in the course of gearshifting after a downshift request, the engine revolutions Ne overshoot the turbine revolutions Nt, so it is necessary to allow for the margin relative to engine over-revving in consideration of that amount of overshoot. On the other hand, in a lockup on state, the engine revolutions Ne and the turbine revolutions Nt are the same, so engine over-revving can be prevented even if the amount of allowance for the margin is reduced. In other words, in a lockup on state, it is possible to set a higher vehicle speed for the downshift allowable vehicle speed in the manual gearshift mode than in the case of a lockup off state (see FIG. 19B).

Consequently, in this example, a downshift allowable vehicle speed allowing for the above margin relative to engine over-revving when in a lockup off state is set as the "reference downshift allowable vehicle speed luspdnor", and when in a lockup on state, the vehicle speed correction amount luadj considering the amount that the vehicle speed can be increased (see FIG. 19B) is used to set the downshift allowable vehicle speed LUSPDEN to the high speed side (LUSPDEN=luspdnor+luadj).

By such setting, it is possible to set an appropriate downshift allowable vehicle speed according to the state of the lockup clutch 25 (lockup on state or lockup off state), so it is possible to expand the downshift allowable region when the manual gearshift mode is selected.

In this example, the downshift allowable vehicle speed in the manual gearshift mode is variably set using the reference downshift allowable vehicle speed luspdnor and a correction amount thereof (the vehicle speed correction amount luadj), but this is not a limitation. A configuration may also be adopted in which the output shaft revolutions Nout of the automatic transmission 3, which correspond to the vehicle speed, are applied to the gearshift control when in the manual gearshift mode, so that the final downshift allowable output shaft revolutions are variably set using the reference downshift allowable output shaft revolutions, which correspond to the above reference downshift allowable vehicle speed luspdnor, and a correction amount of the reference downshift allowable output shaft revolutions.

—Gearshift Control In Manual Gearshift Mode (5)—

First, in this example, in automatic upshift control when in the manual gearshift mode, i.e., in a circumstance in which the engine revolutions will reach the maximum allowable revolutions when the manual gearshift mode has been selected, the ECU 100 executes control whereby engine over-revving is prevented by executing an automatic upshift that reduces the gear ratio of the automatic transmission.

Also in such automatic upshift control when in the manual gearshift mode, the same manner of thinking as in the problem-solving principles of the invention (relationship between the torque converter slippage amount nslp and the margin relative to engine over-revving) described in "Gearshift Control In Manual Gearshift Mode (1)" is possible, so it is possible to set the maximum allowable revolutions in the manual gearshift mode (maximum value of the region where a manual gearshift is possible in the manual gearshift mode) to higher revolutions as the torque converter slippage amount nslp becomes smaller. Accordingly, in this case as well, by variably setting the maximum allowable revolutions according to the torque converter slippage amount nslp, while preventing engine over-revving, it is possible to expand the region where a manual gearshift is possible when the manual gearshift mode is selected, and thus it is possible to achieve an improvement in vehicle operability.

Specifically, a configuration may be adopted in which reference maximum allowable revolutions nespdnor, which correspond to the reference downshift allowable output shaft revolutions spdnor (downshift allowable output revolutions when the slippage amount nslp=0) in above computational formula (1), are adapted by testing/calculation and so forth, and final maximum allowable revolutions NESPDEN are variably set based on below computational formula (3).

$$\text{NESPDEN} = \text{nespdnor} - \text{nslp1}/i_{n-1} \quad (3)$$

Here, nslp1 is the present torque converter slippage amount, and $i_{n-1}$ is the gear ratio of the automatic transmission 3 after a gearshift.

Also, with the same manner of thinking as in above "Gearshift Control In Manual Gearshift Mode (2)", a configuration may be adopted in which, using the reference maximum allowable revolutions nespdnor and an allowable revolutions correction coefficient B, the final maximum allowable revolutions NESPDEN are variably set based on below computational formula (4).

$$\text{NESPDEN} = \text{nespdnor} - B \times \text{nslp1} \quad (4)$$

For the allowable revolutions correction coefficient B, a value adapted according to testing/calculation and so forth, in consideration of the relationship between the torque converter slippage amount nslp and the margin relative to engine over-revving, described in above "Gearshift Control In Manual Gearshift Mode (1)", is applied. Also, in this case, the allowable revolutions correction coefficient B may be set to a smaller value as the vehicle acceleration G becomes smaller.

Furthermore, a configuration may also be adopted in which, when performing the automatic upshift control when in the manual gearshift mode, using the torque converter slippage amount nslp as a parameter, in consideration of the relationship between the torque converter slippage amount nslp and the margin relative to engine over-revving described in above "Gearshift Control In Manual Gearshift Mode (1)", a map (a map that calculates the maximum allowable revolutions of the engine from the torque converter slippage amount nslp and a plurality of threshold values) corresponding to the above-described map in FIG. 16 is created, and the final maximum allowable revolutions NESPDEN are variably set using the created map.

Also, with the same manner of thinking as in above "Gearshift Control In Manual Gearshift Mode (4)", a configuration may be adopted in which the final maximum allowable revolutions NESPDEN are variably set based on the lockup state (lockup on or lockup off) of the lockup clutch 25.

—Other Embodiments—

In the above example, the present invention was applied to control of a vehicle equipped with an automatic transmission having six forward gears, but this is not a limitation; the present invention is also applicable to control of a vehicle equipped with a planetary gear automatic transmission having another arbitrary number of gears.

In the above example, the present invention was applied to control of a vehicle equipped with a planetary gear transmission that sets a gear ratio using clutches, brakes, and a planetary gear apparatus, but this is not a limitation; the present invention is also applicable to control of a vehicle equipped with a belt-driven stepless transmission (CVT) having a torque converter with a lockup clutch.

In the above example, the present invention was applied to control of a vehicle equipped with a port fuel injection-type gasoline engine, but this is not a limitation; the present invention is also applicable to control of a vehicle equipped with an in-cylinder direct injection-type gasoline engine. Also, the present invention is not limited to control of a vehicle equipped with a gasoline engine; the present invention is also applicable to control of a vehicle equipped with another engine, such as a diesel engine.

Furthermore, the present invention is not limited to a vehicle having an FR (front engine/rear drive) configuration, and is also applicable to control of a vehicle having an FF (front engine/front drive) configuration, or a four-wheel drive vehicle.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A vehicle control apparatus, equipped with an engine, an automatic transmission, and a torque converter disposed between the engine and the automatic transmission, the vehicle control apparatus capable of selecting either an automatic gearshift mode in which gearshifting of the automatic transmission is automatically performed according to the vehicle running state, or a manual gearshift mode in which gearshifting of the automatic transmission is performed by manual operation by a driver; the vehicle control apparatus comprising:

an engine revolutions detector that detects revolutions of the engine, a turbine revolutions detector that detects turbine revolutions of the torque converter, a slippage amount calculator that calculates a torque converter slippage amount that is the difference in revolutions between the engine revolutions and the turbine revolutions, and a controller that variably sets a maximum value where manual gearshifting is possible in the manual gearshift mode based on the torque converter slippage amount, and that variably sets a downshift allowable vehicle speed at which a downshift is allowed in the manual gearshift mode based on the torque converter slippage amount.

2. The vehicle control apparatus according to claim 1, wherein the maximum value where manual gearshifting is possible in the manual gearshift mode is set by the controller larger when the torque converter slippage amount is small than when the torque converter slippage amount is large.

3. The vehicle control apparatus according to claim 1, wherein a downshift allowable vehicle speed when the torque converter slippage amount is 0 is set by the controller as a reference allowable vehicle speed, and using the reference allowable vehicle speed and a gear ratio of the automatic transmission after the downshift, an allowable vehicle speed correction amount is calculated based on the present torque converter slippage amount calculated by the slippage amount calculator and the gear ratio after the downshift, and a value obtained by subtracting the allowable vehicle speed correction amount from the reference allowable vehicle speed is set by the controller as the downshift allowable vehicle speed.

4. The vehicle control apparatus according to claim 1, wherein a downshift allowable vehicle speed when the torque converter slippage amount is 0 is set by the controller as a reference allowable vehicle speed, and using the reference allowable vehicle speed and an allowable vehicle speed correction coefficient, an allowable vehicle speed correction amount is calculated by multiplying the allowable vehicle speed correction coefficient by the present torque converter slippage amount calculated by the slippage amount calculator, and a value obtained by subtracting the allowable vehicle speed correction amount from the reference allowable vehicle speed is set by the controller as the downshift allowable vehicle speed.

5. The vehicle control apparatus according to claim 4, wherein the allowable vehicle speed correction coefficient is set by the controller to a smaller value as vehicle acceleration decreases.

6. The vehicle control apparatus according to claim 1, wherein for the torque converter slippage amount calculated by the slippage amount calculator, a plurality of threshold values that differ from each other are set in steps, the downshift allowable vehicle speed for each of those threshold values is set by the controller lower for a larger threshold value, and the downshift allowable vehicle speed is calculated by comparing the torque converter slippage amount calculated by the slippage amount calculator to the plurality of threshold values.

7. The vehicle control apparatus according to claim 1, wherein the downshift allowable vehicle speed is prescribed by revolutions of an output shaft of the automatic transmission corresponding to vehicle speed.

8. A vehicle control apparatus, equipped with an engine, an automatic transmission, and a torque converter disposed between the engine and the automatic transmission, the vehicle control apparatus capable of selecting either an automatic gearshift mode in which gearshifting of the automatic transmission is automatically performed according to the vehicle running state, or a manual gearshift mode in which gearshifting of the automatic transmission is performed by manual operation by a driver; the vehicle control apparatus comprising:

means for detecting revolutions of the engine, means for detecting turbine revolutions of the torque converter, means for calculating a torque converter slippage amount that is the difference in revolutions between the engine revolutions and the turbine revolutions, and means for variably setting a maximum value where manual gearshifting is possible in the manual gearshift mode based on the torque converter slippage amount and a downshift allowable vehicle speed at which a downshift is allowed in the manual gearshift mode based on the torque converter slippage amount.

9. A vehicle control apparatus, equipped with an engine, an automatic transmission, and a torque converter disposed between the engine and the automatic transmission, the vehicle control apparatus capable of selecting either an automatic gearshift mode in which gearshifting of the automatic transmission is automatically performed according to the vehicle running state, or a manual gearshift mode in which gearshifting of the automatic transmission is performed by manual operation by a driver; the vehicle control apparatus comprising:

an engine revolutions detector that detects revolutions of the engine, a turbine revolutions detector that detects turbine revolutions of the torque converter, and a slippage amount calculator that calculates a torque converter slippage amount that is the difference in revolutions between the engine revolutions and the turbine revolutions, and a maximum value where manual gearshifting is possible in the manual gearshift mode is variably set based on the torque converter slippage amount, a downshift allowable vehicle speed at which a downshift is allowed in the manual gearshift mode is variably set based on the torque converter slippage amount, a downshift allowable vehicle speed when the torque converter slippage amount is 0 is set as a reference allowable vehicle speed, and using the reference allowable vehicle speed and a gear ratio of the automatic transmission after the downshift, an allowable vehicle speed correction amount is calculated based on the present torque converter slippage amount calculated by the slippage amount calculator and the gear ratio after the downshift, and a value obtained by subtracting the allowable vehicle speed correction amount from the reference allowable vehicle speed is set as the downshift allowable vehicle speed.

* * * * *

UNITED STATES PATENT AND TRADEMARK OFFICE
CERTIFICATE OF CORRECTION

| | |
|---|---|
| PATENT NO. | : 8,489,292 B2 |
| APPLICATION NO. | : 12/608278 |
| DATED | : July 16, 2013 |
| INVENTOR(S) | : Hitoshi Matsunaga et al. |

It is certified that error appears in the above-identified patent and that said Letters Patent is hereby corrected as shown below:

On the title page, Item (73), the Assignee information is incorrect. Item (73) should read:

--(73) Assignee: Toyota Jidosha Kabushiki Kaisha,
Toyota-shi (JP)--

Signed and Sealed this
Twenty-fourth Day of September, 2013

Teresa Stanek Rea
*Deputy Director of the United States Patent and Trademark Office*